(12) United States Patent
Zhang et al.

(10) Patent No.: US 12,280,297 B2
(45) Date of Patent: Apr. 22, 2025

(54) POSE COMPARISON SYSTEMS AND METHODS USING MOBILE COMPUTING DEVICES

(71) Applicant: NEX Team Inc., San Jose, CA (US)

(72) Inventors: Qi Zhang, Tseung Kwan O (HK); Keng Fai Lee, Cupertino, CA (US); Daniel Dejos, Seattle, WA (US); Jorge Fino, San Jose, CA (US); Long Mak, Shatin (HK)

(73) Assignee: NEX Team Inc., San Jose, CA (US)

( * ) Notice: Subject to any disclaimer, the term of this patent is extended or adjusted under 35 U.S.C. 154(b) by 0 days.

(21) Appl. No.: 17/476,484

(22) Filed: Sep. 16, 2021

(65) Prior Publication Data

US 2022/0080260 A1    Mar. 17, 2022

Related U.S. Application Data

(60) Provisional application No. 62/706,884, filed on Sep. 16, 2020.

(51) Int. Cl.
*A63B 24/00* (2006.01)
*A63B 71/06* (2006.01)
(Continued)

(52) U.S. Cl.
CPC ...... *A63B 24/0006* (2013.01); *A63B 24/0062* (2013.01); *A63B 71/0622* (2013.01);
(Continued)

(58) Field of Classification Search
CPC ............ A63B 24/0006; A63B 24/0062; A63B 71/0622; A63B 2024/0015;
(Continued)

(56) References Cited

U.S. PATENT DOCUMENTS 5,667,459 A * 9/1997 Su ...................... A63B 71/0622
482/3
6,663,491 B2 * 12/2003 Watabe ................... A63F 13/45
463/7

(Continued)

OTHER PUBLICATIONS

Fitnet, "Personal Trainer for Everyone", Fitnet-Video Fitness Trainer. Accessed Sep. 2021. Available at: http://fit.net/.
(Continued)

*Primary Examiner* — Malina D. Blaise
(74) *Attorney, Agent, or Firm* — American Patent Agency PC; Daniar Hussain; Stephen M. Hou

(57) ABSTRACT

Methods and systems are disclosed for pose comparison, interactive physical gaming, and remote fitness training on a user computing device. The methods and systems are configured to first receive a reference feature generated from a frame of a reference video, the reference feature computed from a reference posture of a reference person in the frame of the reference video. Next, receive a frame of a user video, the frame of the user video comprising a user. Next, extract a user posture from the frame of the user video, by performing a machine learning-based computer vision algorithm that detects one or more body key points of the user in an image plane of the user video. Finally, generate a user feature from the user posture; and determine an output score based on a distance between the reference feature and the user feature.

12 Claims, 18 Drawing Sheets

(51) Int. Cl.
  *G06N 3/08* (2023.01)
  *G06V 20/40* (2022.01)
  *G06V 40/10* (2022.01)
  *G06V 40/20* (2022.01)

(52) U.S. Cl.
  CPC ............... *G06N 3/08* (2013.01); *G06V 20/46* (2022.01); *G06V 40/103* (2022.01); *G06V 40/23* (2022.01); *A63B 2024/0015* (2013.01); *A63B 2024/0068* (2013.01); *A63B 2024/0071* (2013.01); *A63B 2071/0677* (2013.01)

(58) Field of Classification Search
  CPC .... A63B 2024/0068; A63B 2024/0071; A63B 2071/0677; G06V 20/46; G06V 40/103; G06V 40/23; G06N 3/08
  See application file for complete search history.

(56) References Cited

U.S. PATENT DOCUMENTS

| | | | | |
|---|---|---|---|---|
| 7,717,858 B2* | 5/2010 | Massad | ................ | A61B 5/1135 361/278 |
| 7,985,164 B2* | 7/2011 | Ashby | ................... | H04L 67/12 482/901 |
| 8,983,124 B2* | 3/2015 | Kourogi | ................. | G01S 11/12 382/103 |
| 10,086,283 B2* | 10/2018 | Trewartha | ............. | A63F 13/211 |
| 2002/0019258 A1* | 2/2002 | Kim | ........................ | A63F 13/45 463/36 |
| 2004/0102931 A1* | 5/2004 | Ellis | ..................... | A61B 5/0833 702/188 |
| 2008/0161733 A1* | 7/2008 | Einav | .................. | A63B 21/012 482/9 |
| 2009/0233769 A1* | 9/2009 | Pryor | ................. | A63B 24/0062 482/8 |
| 2010/0035688 A1* | 2/2010 | Picunko | ................ | G01S 1/7038 463/30 |
| 2010/0210975 A1* | 8/2010 | Anthony, III | ........ | A61B 5/1123 600/595 |
| 2010/0316983 A1* | 12/2010 | Johns, Jr. | ............... | A63B 69/02 434/247 |
| 2012/0143358 A1* | 6/2012 | Adams | ................ | G06F 3/04815 700/92 |
| 2012/0271143 A1* | 10/2012 | Aragones | ................. | G09B 5/02 600/595 |
| 2014/0073486 A1* | 3/2014 | Ahmed | .................... | A61B 5/11 600/479 |
| 2019/0122577 A1* | 4/2019 | Mora | ........................ | G09B 5/06 |
| 2022/0051061 A1* | 2/2022 | Chi | ....................... | G06N 3/0454 |

OTHER PUBLICATIONS

Krishna Raj R., "Human Pose Comparison and Action Scoring using Deep Learning, OpenCV & Python", Analytics Vidhya Medium, Apr. 13, 2020, pp. 1-12.

Tempo, "AI-Powered Home Gym With Personalized Guidance for Every Workout", The Award-Winning AI-Powered Home Gym. Accessed Sep. 2021. Available at: https://tempo.fit/.

Mirror, "The Nearly Invisible Home Gym", The holy grail of home gyms. Accessed Sep. 2021. Available at: https://www.mirror.co/.

* cited by examiner

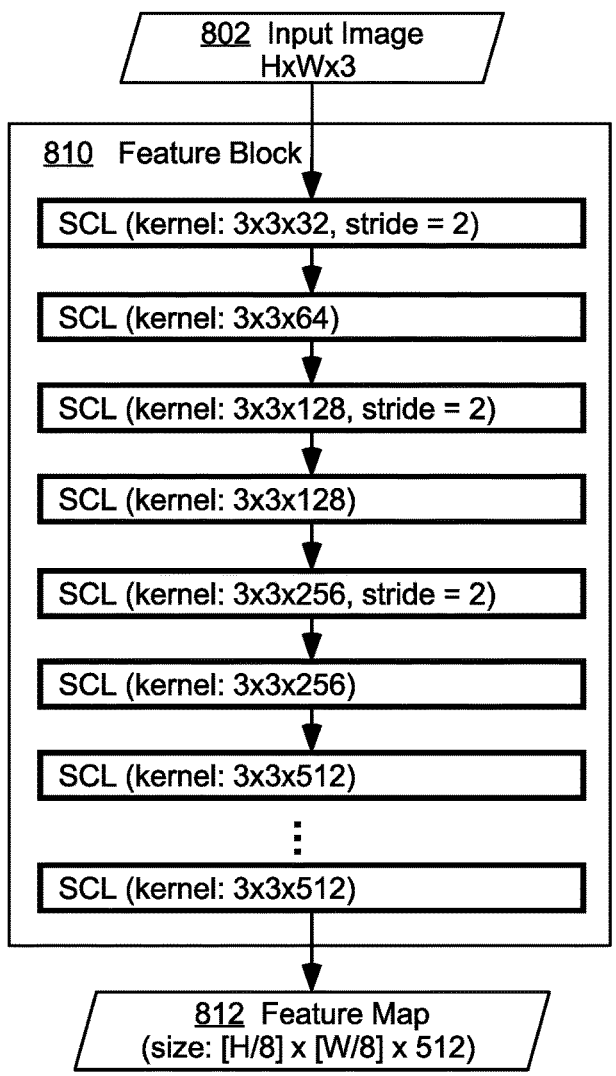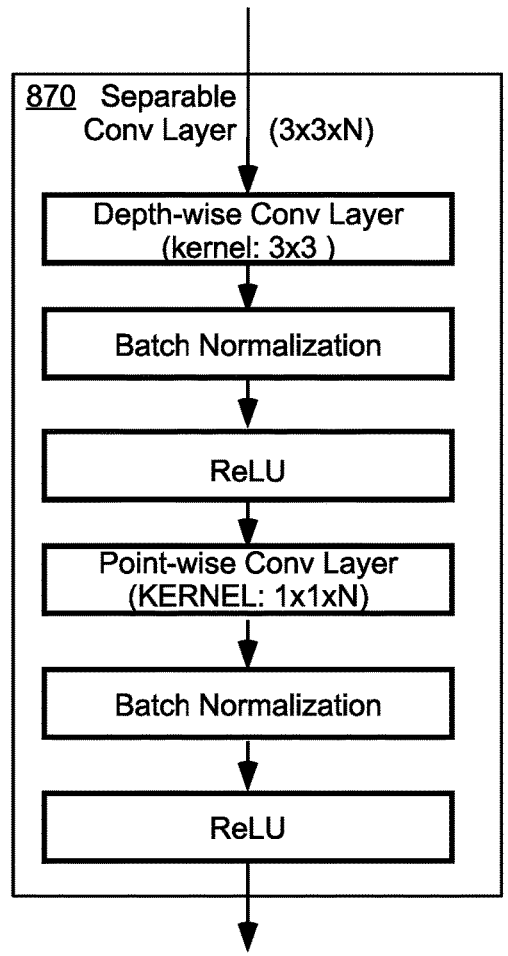
FIG. 8B
FIG. 8C

POSE COMPARISON SYSTEMS AND METHODS USING MOBILE COMPUTING DEVICES

REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

This application is also related to U.S. Ser. No. 16/445,893, filed on 19 Jun. 2019, entitled "Remote Multiplayer Interactive Physical Gaming with Mobile Computing Devices," issued on 5 May 2020 as U.S. Pat. No. 10,643,492; U.S. Ser. No. 16/555,812, filed on 29 Aug. 2019, entitled "Methods and Systems for Facilitating Interactive Training of Body-Eye Coordination and Reaction Time," issued on 24 Mar. 2020 as U.S. Pat. No. 10,600,334; and U.S. Ser. No. 17/008,923, filed on 1 Sep. 2020, entitled "Methods and Systems for Multiplayer Tagging for Ball Game Analytics Generation with a Mobile Computing Device". This application is further related to U.S. Ser. No. 16/109,923, filed on 23 Aug. 2018, entitled "Methods and Systems for Ball Game Analytics with a Mobile Device," issued on 26 Nov. 2019 as U.S. Pat. No. 10,489,656, and to U.S. Ser. No. 16/424,287, filed on 28 May 2019, entitled "Methods and Systems for Generating Sports Analytics with a Mobile Device".

The entire disclosures of all referenced applications are hereby incorporated by reference in their entireties herein.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention are in the fields of fitness training and physical gaming, and pertain particularly to methods and systems for enabling pose comparison during a physical activity using one or more mobile computing devices having cameras for video capture.

BACKGROUND OF THE INVENTION

The statements in this section may serve as a background to help understand the invention and its application and uses, but may not constitute prior art.

The fast pace of modern lifestyle relies on one's health and fitness, and regular exercises inside or outside a gym are a habit and routine for many. In recent years, home gym setups have become increasingly popular, with benefits in cost, scheduling flexibility, privacy, safety, and the general ease of being able to exercise in multiple short intervals without leaving home. The unexpected onset of the global coronavirus pandemic has rapidly accelerated this workout-from-home trend, as gyms closed and remote and virtual work set in. Nonetheless, some downsides of home fitness training include lack of routine, lack of motivation in a social environment, and lack of proper form learning from coaches, personal trainers, or therapists. Pre-recorded workout videos provide a somewhat effective solution where one can follow pre-designed exercise routines in aerobics, yoga, dance, cardio, even kickboxing, with or without any fitness equipment, yet the passive-viewing nature of video means interactive training with live feedback is still missing. Feedback on not just workout intensity but workout form is extremely important for lowering the risk of injury and pain, and for achieving a high performance level and efficiency.

In recent years, advances in modern computing and networking technology have enabled active video games, exergames, or interactive fitness games that combine physical activities with video games, by relying on real-time motion tracking techniques and virtual reality capabilities, yet these are often goal-orientated and provide little information on the player's form or physical state. Some gyms, health clubs, recreational centers, and schools incorporate exergames into their facilities using specialized equipment. For example, interactive wall-climbing games, active floor and wall games, and dance and step games have become popular in recent years, but each require pre-installed sensing and display devices such as interactive walls and floors with embedded sensors, and large projector screens. Similarly, interactive home systems rely on specialized equipment and wearable sensors that come with high cost, large floor print, lack of portability, and limited options in the types of physical activities or exercises that can be monitored and tracked, yet no home system is able to provide automatic feedback on proper player form.

Therefore, in view of the aforementioned difficulties, there is an unsolved need to design a platform on a general computing device to allow low cost, interactive, and remote fitness training, and physical activity gaming. It would also be an advancement in the state of the art to enable real-time form monitoring and training.

It is against this background that various embodiments of the present invention were developed.

BRIEF SUMMARY OF THE INVENTION

Some embodiments of the present invention include methods, systems, and apparatuses for enabling pose comparison, form training, and interactive physical activities with a user computing device.

In a first aspect, one embodiment of the present invention is a method for pose comparison on a user computing device. The method comprises the following steps: receiving, on the user computing device, a reference feature generated from a frame of a reference video, wherein the frame of the reference video comprises a reference person, and wherein the reference feature is computed from a reference posture of the reference person in the frame of the reference video; receiving, on the user computing device, a first frame of a user video, wherein the first frame of the user video comprises a user; extracting a first user posture from the first frame of the user video, by performing a machine learning-based computer vision algorithm on the first frame of the user video, wherein the machine learning-based computer vision algorithm detects one or more body key points of the user in an image plane of the user video; generating a first user feature from the first user posture; and determining an output score based on a first distance between the reference feature and the first user feature.

In some embodiments, the user computing device is a mobile computing device.

In some embodiments, the first frame of the user video is from a camera on the user computing device.

In some embodiments, the user video is live-streamed.

In some embodiments, the machine learning-based computer vision algorithm comprises a convolutional neural network.

In some embodiments, the method further comprises the following steps: receiving, on the user computing device, the reference video; extracting the reference posture of the reference person in the frame of the reference video, by performing the machine learning-based computer vision algorithm on the frame of the reference video; and generating the reference feature from the reference posture.

In some embodiments, the method further comprises the following steps: extracting a second user posture from a second frame of the user video, by performing the machine learning-based computer vision algorithm on the second frame of the user video; and generating a second user feature from the second user posture, wherein the determining the output score is further based on a second distance between the reference feature and the second user feature.

In some embodiments, the first frame of the user video is one frame in a plurality of frames of the user video, the first user posture is one posture in a user posture flow extracted from the plurality of frames using the machine learning-based computer vision algorithm, and the first user feature is generated from the user posture flow. In some embodiments, the plurality of frames of the user video spans over a predetermined time duration.

In some embodiments, the first user feature is a vector, the generating the first user feature from the first user posture is based on a plurality of limb angles relative to a torso of the user, and the plurality of limb angles is determined based on the first user posture.

In some embodiments, the first user feature is a vector, and the generating the first user feature from the user posture flow comprises the following steps: generating the user feature based on a trajectory of a body key point associated with a portion of the user's body; and normalizing the user feature by subtracting a mean of the user feature's vector components from each vector component, and dividing by a standard deviation of the vector components.

In some embodiments, the distance between the reference feature and the first user feature is determined based on a weight associated with a portion of the user's body. In some embodiments, the weight is determined based on a degree of motion associated with the portion of the user's body.

In some embodiments, the machine learning-based computer vision algorithm has been trained using one or more training videos.

In another aspect, one embodiment of the present invention is a device for pose comparison, comprising a processor and a non-transitory physical storage medium for storing program code accessible by the processor, the program code when executed by the processor causes the processor to: receive a reference feature generated from a frame of a reference video, wherein the frame of the reference video comprises a reference person, and wherein the reference feature is computed from a reference posture of the reference person in the frame of the reference video; receive a frame of a user video, wherein the frame of the user video comprises a user; extract a first user posture from the frame of the user video, by program code to perform a machine learning-based computer vision algorithm on the frame of the user video, wherein the machine learning-based computer vision algorithm detects one or more body key points of the user in an image plane of the user video; generate a first user feature from the first user posture; and determine an output score based on a first distance between the reference feature and the first user feature.

In some embodiments, the device is a mobile computing device.

In some embodiments, the device further comprises a camera, and the frame of the user video is from the camera on the device.

In some embodiments, the user video is live-streamed.

In yet another aspect, one embodiment of the present invention is a non-transitory computer-readable physical storage medium for pose comparison, the storage medium comprising program code stored thereon, and the program code when executed by a processor causes the processor to: receive a reference feature generated from a frame of a reference video, wherein the frame of the reference video comprises a reference person, and wherein the reference feature is computed from a reference posture of the reference person in the frame of the reference video; receive a frame of a user video, wherein the frame of the user video comprises at least a user; extract a first user posture from the frame of the user video, by program code to perform a machine learning-based computer vision algorithm on the frame of the user video, wherein the machine learning-based computer vision algorithm detects one or more body key points of the user in an image plane of the user video; generate a first user feature from the first user posture; and determine an output score based on a first distance between the reference feature and the first user feature.

In some embodiments, the frame of the user video is from a camera on a user computing device.

Yet other aspects of the present invention include methods, processes, and algorithms comprising the steps described herein, and also include the processes and modes of operation of the systems and servers described herein. Yet other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which.

FIG. 8B is a detailed block diagram illustrating an exemplary Feature Block, according to exemplary embodiments of the present invention;

FIG. 8C is a detailed block diagram illustrating an exemplary separable convolutional neural network layer, according to exemplary embodiments of the present invention;

DETAILED DESCRIPTION OF THE INVENTION

Figure 1A:
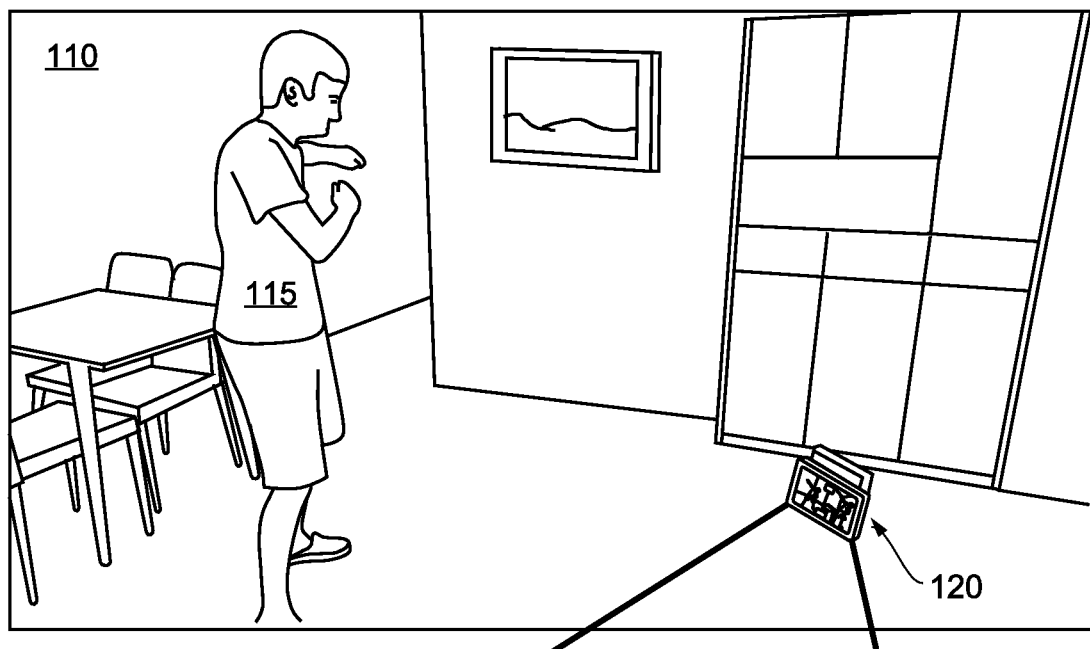
FIG. 1A is a diagram illustrating gamified interactive physical activity and fitness training with a mobile computing device utilizing computer vision and artificial intelligence, according to one embodiment of the present invention.
Figure 1A:
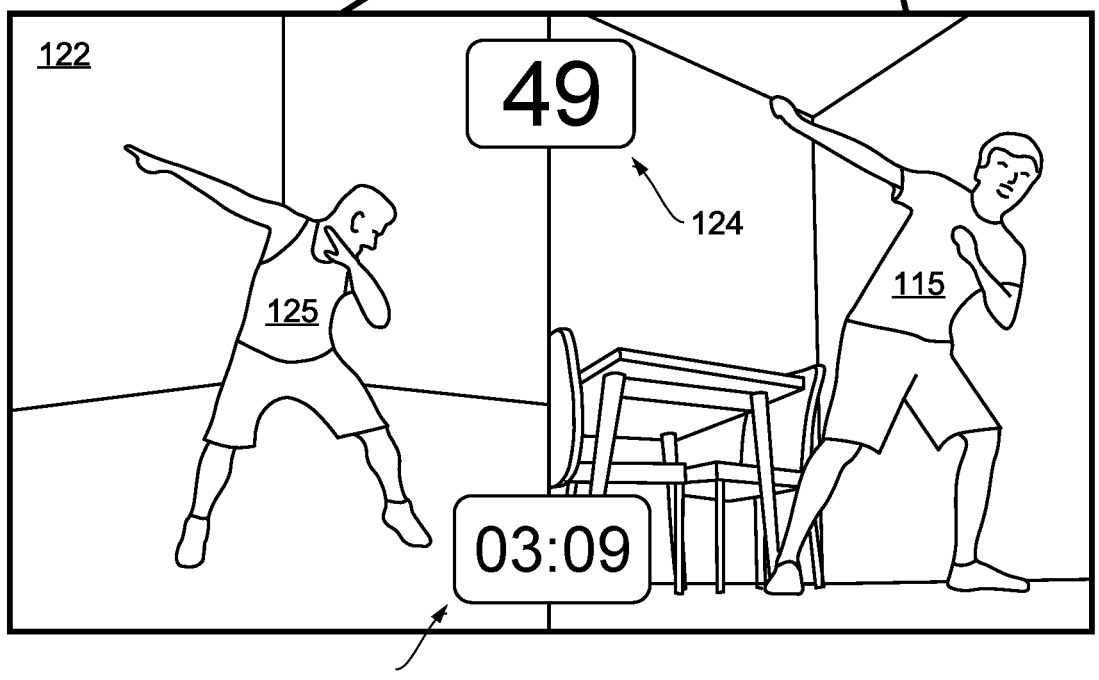

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon the invention.

NEX, NEX TEAM, and HOMECOURT are trademark names carrying embodiments of the present invention, and hence, the aforementioned trademark names may be interchangeably used in the specification and drawings to refer to the products/services offered by embodiments of the present invention. The term NEX, NEX TEAM, or HOMECOURT may be used in this specification to describe the overall pose comparison system, the interactive gaming platform, as well as the company providing said system and platform. With reference to the figures, embodiments of the present invention are now described in detail.

Introduction and Overview

Broadly, embodiments of the present invention relate to interactive fitness training and physical gaming, where one or more users' form, range of motion, and/or sequential motion over a period of time is monitored, analyzed, and cross-compared on a user computing device, then feedback reported to the user locally or remotely.

More particularly, embodiments of the present invention pertain to a platform deploying methods and systems for pose comparison via artificial-intelligence (AI)-based computer vision techniques, where user posture features are generated from postures or posture flows extracted from user videos, possibly recorded by a user computing device, then compared to reference posture features to generate a feedback. A reference posture feature may be determined by an external server or on the user computing device itself. Exemplary user computing devices include, but are not limited to, general purpose personal computers, tablets, and other mobile computing devices such as smart phones and glasses.

The computer-vision based NEX platform as disclosed herein enables anyone to learn posture and movement skills by replicating a physical activity demonstrated by a reference, target, or leader person, for training purposes or for pure entertainment. In one example, a user may learn to dance, to play a sport, or to perform physiotherapy by watching and following a leader video. In another example, a personal trainer or instructor may demonstrate movements and forms in real time via video conferencing through the NEX platform. In either case, the NEX platform as disclosed herein may determine whether a user has successfully completed an action as presented by a leader, and/or whether the user has replicated the proper forms as presented by the leader as accurately as possible.

During any physical activity, proper techniques and proper form are always extremely important for minimizing the risk of injury and pain, and for maximizing performance. For example, insufficient stretching and improper running strides may induce knee and/or foot injury; improper forms during weight lifting, such as misalignment of certain body axes and/or joints, incomplete utilization of the core, or inadequate range of motion of the limbs, may cause insufficient use of certain muscle groups, leading to unnecessary pressure on joints, unsatisfactory body building results, and potential injuries.

More specifically, as will be described in connection with the drawings, embodiments of present invention are directed to systems, methods, and apparatuses that allow for a first person (e.g., a leader or a reference) to generate movements (e.g., sport-related movements, dance movements, yoga poses etc.) which are mirrored by a second person (e.g., a follower or a player) who is a user of the systems, methods, and apparatuses as disclosed herein. Leader and follower movements are captured on video; their posture sequences, flows, or trajectories are analyzed via machine-learning based computer vision algorithms; and an algorithmic comparison score may be generated. Visual and/or quantitative feedbacks may be provided to the follower in real time or at the end of a specific time period. This process of movement replication with visual and/or quantitative feedbacks may be viewed as an interactive physical game.

It would be understood by persons of ordinary skill in the art that the terms "fitness activity" and "physical game" in this disclosure broadly refer to any real-world physical activity, with or without specific goals and/or challenges. A physical game differs from a video game as it is not played exclusively on-screen. Instead, a physical game may comprise any physical body movement, action, workouts, or sports. Examples include, by are not limited to, wall and floor activities such as wall climbing, gymnastics, dancing (e.g., Zumba, ballet, hip hop), yoga, Pilates, and Tai Chi; any combination of simple exercises such as stretches, pushups, sit-ups, planks, and jumping jacks; any conventional or home gym workouts such as weight lifting, stationary biking, treadmill running; any sports such as tennis, fencing, swimming, basketball, soccer, cheerleading; any activity that mostly utilizes parts of a person's body, such as piano playing, language signing, hand and arm signaling, ball serving in table tennis; and many more. The gamification of such physical activities refers to how a follower or a player mimics a leader's positions in time and space, and how a game score may be obtained based on the degree to which the follower replicates the leader's movements accurately.

In some embodiments, a physical game may involve multi-player or group activities, such as partner yoga, couple dance, and cheerleading. In some embodiments, a physical game may be a competitive activity involving individual players or opposing teams. In addition, a "play" or "game play" of a physical game may refer to one run of a leader video or an instance game conducted by one or more players.

In some embodiments, a leader video may be pre-recorded or segmented from any existing video (e.g., a video from an Internet-based web site, a video as it is captured live, or a video stored locally on a follower's user computing device). In some embodiments, the leader may be a direct user of the disclosed NEX platform as well, with the platform capable of recording, analyzing, and storing the leader video, storing extracted leader analytics including postures and features, as well as uploading the leader video and/or analytics to a third party or a remote server for later use. In some embodiments, the leader and the follower may be located in separate physical locations, each with his or her own user device for video capturing and/or analysis, asynchronously or concurrently. In some embodiments, the leader and the follower may be located in the same physical location, where a single input video captured in real-time by the user device may be used as both the leader video and the follower video. In some embodiments, there may be multiple followers mimicking the same leader, to compete against each other asynchronously or in real-time.

One feature of the present invention is the novel design of AI-based computer vision techniques run on general purpose user computing devices, such as a laptop, a tablet, or a smart phone. Existing computer vision-based systems that facilitate physical games typically require dedicated sensor equipment such as 3D cameras mounted on top of a large reflective display screen, or sensing bars mounted on top of a TV. By comparison, embodiments of the present invention allow users to perform real-time monitoring, analysis, and interactive control of a physical game with a general-purpose mobile device by utilizing simple on-device cameras and general-purpose processors. Embodiments of the present invention may provide one or more of game instruction display, compliance detection, scoring, refereeing, and feedback to one or more users. Innovative and efficient object detection and posture tracking techniques thus deployed enable the analysis of game images and/or videos captured by on-device cameras to determine user analytics including movement patterns, full body or body part postures, and whether attempts at duplicating particular leader actions have been successful.

The generation of analytics such as scores associated with pose comparisons between a user and a leader comprises the analysis of video recordings to determine movement pattern and postures, and optionally other objects present in a gaming area. In various embodiments, computer vision techniques such as image registration, motion detection, background subtraction, objection tracking, 3D-reconstruction techniques, cluster analysis techniques, camera calibration techniques such as camera pose estimation and sensor fusion, and modern machine learning techniques such as convolutional neural network (CNN), may be selectively combined to perform high accuracy analysis in real-time on the user computing device.

In some embodiments, the interactivity provided by the NEX platform as disclosed herein stems from real-time user posture flow analysis and feedback generation, where feedback to a user may include a direct or mirrored video of the user performing the desired movements, a running average or cumulative score for past movements, current user analytics for one or more users, visual and/or audio instructions for upcoming movements, instructions for a new round or new play of the game, and the like. Such feedback may be visually displayed, for example on a user interface such as a touchscreen, or audibly displayed, for example broadcasted to the user through a loudspeaker. As a physical game is not rooted in the virtual world, some embodiments of the present invention do not require users to interact with an on-device screen or similar user interfaces of the mobile device. Instead, instructions and/or feedback to the player may be communicated through audio broadcast and/or visual projections, and user input may be collected via speech recognition or additional posture recognition.

Another feature of the present invention is its ability to facilitate remote multi-player physical games, where users at geographically different gaming areas can participate in physical games together or engage in activities against one another using one or more network-connected user computing devices. Each user device may be mounted on a tripod placed in a separate gaming area, to capture movements and actions of one or more players in the gaming area. Posture analytics for a given player may be communicated to other user devices, with or without passing through a central game server, for generating posture comparisons and player feedbacks such as scores or game instructions. In some embodiments, the disclosed NEX systems may facilitate remote multi-player physical games where each player of a group of players may take turn being a leader who generates a sequence of movements for others to follow. A competition among the multiple players may be facilitated by ranking how well the multiple players mimic the leader's body movements. In some embodiments, a central game server may collect player analytics for each participating player to determine whether the game has been won by a particular player.

An Exemplary Embodiment for Interactive Physical Gaming and Remote Training

Figure 1B:
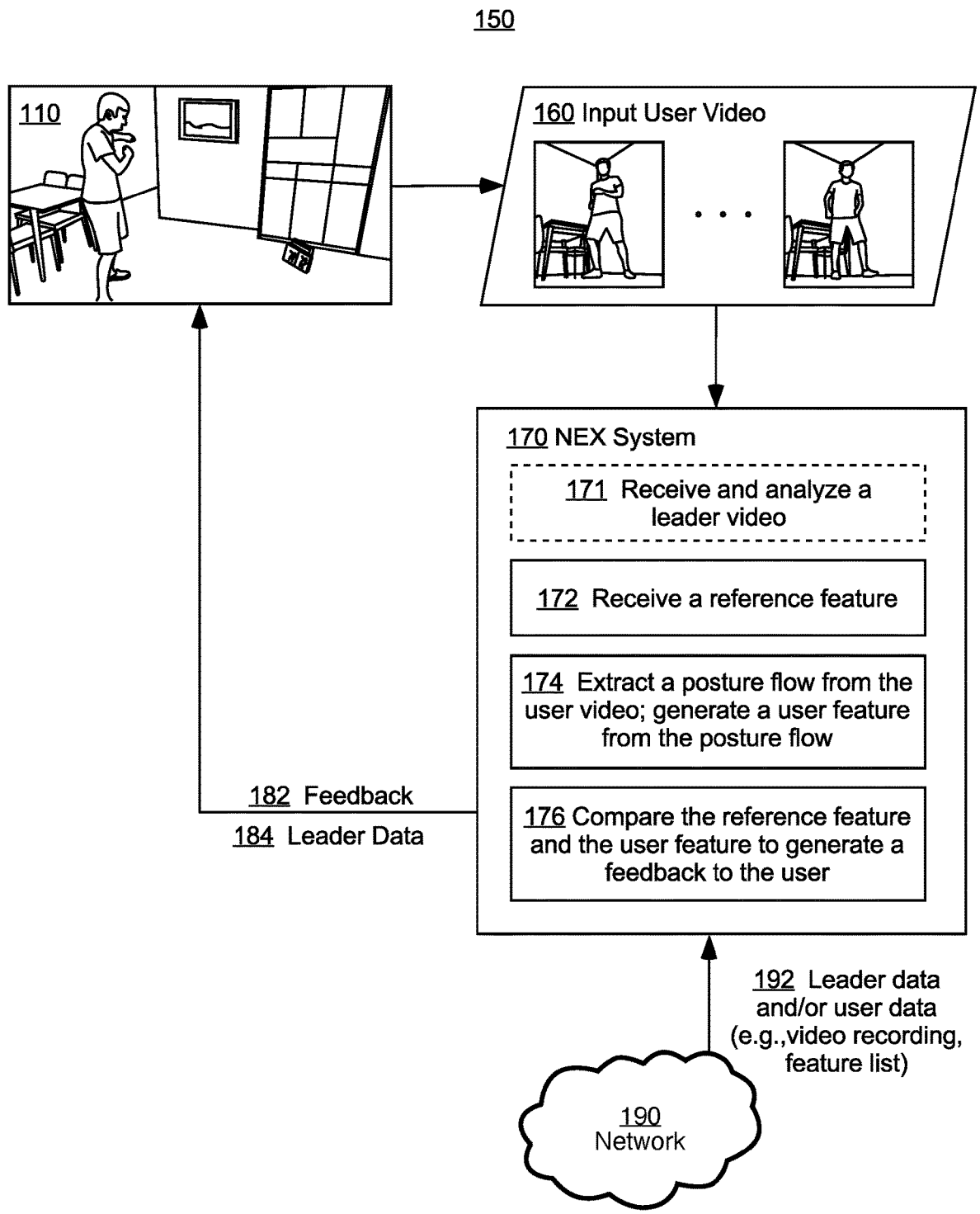
FIG. 1B is an architectural overview of a mobile device-based system for pose comparison in interactive physical gaming, according to one embodiment of the present invention.

As an illustrative embodiment, FIGS. 1A and 1B show respective setup 100 and architectural overview 150 of a NEX system for gamified interactive physical activity and remote fitness training with a mobile computing device utilizing computer vision and artificial intelligence, according to one embodiment of the present invention.

FIG. 1A shows an illustrative setup 110 where a player 115 deploys a user computing device 120 in a game area. In this example, user computing device 120 is a mobile smart phone having a camera. An illustrative screen capture 122 of user computing device 120 comprises two sections: a leader section on the left showing a video of a leader 125 performing a sequence of movements such as a dance workout or physiotherapy routine, and a user section on the right showing a live video of user 115 following leader 125's motion in time, as captured by a camera on user computing device 120.

The NEX platform as disclosed herein may analyze temporally correlated sections or fragments of the leader and user videos to determined how well or how accurately user 115 replicates the body movements of leader 125. A running score 124 may be displayed to user 115, and a "time remaining" section 126 may show user 115 how much time is left in the leader video, or in the present interactive physical game.

In this disclosure, the terms "user," "follower," and "player" are used interchangeably, assuming that a user of a user computing device such as 120 shown in FIG. 1A is a player participating in an interactive physical game facilitated by a NEX platform implemented on the user computing device, where the user attempts to follow and imitate physical movements as presented by a reference, target, or leader person.

A gaming area or game area may be any designated space for playing an interactive physical game, indoor or outdoor, with or without markings, with or without equipment, and under varying lighting conditions. In the example shown in FIG. 1A, the game area is user 115's dining and family room in his home environment. Exemplary gaming areas include, but are not limited to, dance floors, yoga studios, gymnasium, balance beams, trampolines, weight benches, diving platforms, living room floors, and baby playmats. In some embodiments, the NEX system may detect and analyze typical gaming areas with minimal or no user input, by automatically detecting gaming area identifiers such doors, windows, furniture, marked end lines, and equipment such as weights, resistance bands, stationary bikes, and elliptical machines. In some embodiments, user input may be received on user computing device 120 to indicate a type and range of the gaming area. For example, the NEX system may provide an option for a player to identify the ends of a balance beam by tapping on a captured image of the gaming area, or to verify an automatically determined location manually and adjust if necessary. In some embodiments, image stabilization and similar technique may be deployed for robustness against vibration or accidental movements of the user computing device.

Videos of individual players or teams in each gaming area as captured by user computing devices such as 120 shown in FIG. 1A may be analyzed using AI-based computer vision algorithms to extract object flows, including equipment trajectories and player posture flows. Subsequently, object flows may be analyzed to generate individual player analytics including body key point trajectories. For example, user 115's hand position may be tracked and compared to that of leader 125 to determine whether user 115 has completed an arm stretch or wing flap as taught by leader 125. Further, the disclosed systems may determine how well user 115 has matched the form of leader 125 in making the attempt (e.g., how well user 115 has aligned his shoulder blades and arms when compared to leader 125).

In this example, player 115 is following leader 125's movements as the video of leader 125 is playing, with rhythms of a background music from the leader video and with delays in the seconds range. In another example, player 115 may wait until leader 125 has completed a particular action to mimic the action, with the leader video temporarily paused, automatically or upon a user input such as a voice or posture input. For instance, leader 125 may instruct on how to slowly reach a particularly difficult yoga pose, and user 115 may choose to wait until leader 125 has settled into the position to repeat the overall process. Similarly, leader 125 may illustrate a particular dance move like a ballet arabesque, and user 115 may choose to follow immediately or with an intentional delay after which the leader video may be paused temporarily.

In some embodiments, additional player analytics may be generated by user device 120 from the player video. In general, the term analytics refers to meaningful patterns, knowledges, and information from data or statistics. Player analytics for a physical game may refer to quantitative and qualitative characterizations of player actions, specific to a given player. For example, one player analytic already discussed refers to a score representing the degree to which the player matches the motions of a leader. Player analytics may also be used more broadly, for example, to characterize a player's actions in relation to a particular game or activity in which the player can participate, in addition to or separate from matching the motion of a given leader. Some examples of player analytics include, but are not limited to, limb angles relative to a torso or relative to each other, back bend angle, jump height, body rotation, leg movement pattern and speed, gait, hand and feet trajectory, and action quality scores.

Furthermore, an analytic may be specific to a particular goal or challenge, such as repeating the leader's demonstrated back stretch 60 times. In addition, game analytics may refer to statistical analytics generated from player analytics over the duration of a game, over an entire length of a leader video, or over a time period to complete a particular goal or challenge. Team analytics may refer to analytics aggregated across multiple players.

Although not shown in FIG. 1A, NEX system modules implemented on user computing device 120 may communicate with other user devices, directly or through a NEX game server via a network. For example, leader 125 may be live-streaming his video via his own user device, and other users may be following the live leader stream at the same time as player 115, with other players' videos and/or analytics downloaded to user device 120 and optionally presented to user 115. Similarly, player 115's video and/analytics collected by user computing device 120 may be uploaded to a NEX server, and in turn downloaded to all other user devices. Each user device may generate updated feedback to its associated player, based on one or more player analytics collected from one or more players and/or leaders.

In this disclosure, having multiple players playing an interactive physical game "synchronously", "in real-time", at the "same time" and "overlap in time", refers to multiple players following the same leader video around the same timeframe, taking into account of possible network delays, and minor time differences where one player may be initializing the game while another player has already started a physical play. In some embodiments, game plays may take place in asynchronously, wherein individual game plays may overlap only partially in time, or do not overlap in time at all. In various embodiments, the disclosed systems can be utilized to enable asynchronous games such that each player of the game mimics the leader video at different times that each player picks. In some embodiments, players who play later may be allowed to watch game recordings of earlier plays by other players, regardless of whether the earlier plays are still in session. In some embodiments, a later player may choose an earlier recording of another player as the leader video, for example for motivational or pure entertainment purposes. In yet some other embodiments, more than one leader person may be present in a leader video, and different players may choose to follow the same or different leaders in the leader video, with individual scores combined or compared, depending on if the players are playing as a team or as competitors.

FIG. 1B is an architectural overview 150 of an exemplary user computing device-based system for interactive physical gaming, according to some embodiments of the present invention. While FIG. 1B shows an example of a dance workout, the disclosed systems may be used in connection with other suitable physical activities or sports as well, optionally with other activity-specific analytics generated for various player actions/motions, in addition to the generation of one or more scores characterizing the degree to which a player mimics one or more particular actions or movement sequences by a leader. For example, the leader can demonstrate certain movements in a ball game such as a basketball pull up jump shot, and the follower may attempt to replicate the same type of shot via a similar motion as the leader, with the disclosed systems generate a score accordingly to reflect the degree of similarity. In some embodiments, the score may be based on the motion of certain selected body parts only. In some embodiments, the score may also be based on the player's position relative to some other objects in the game area, such as a shooter's distance from a goal post when a shot is made.

A NEX system 170 shown in FIG. 1B may be implemented on a user computing device such as 120 in FIG. 1A to capture player actions in the setup 110. More specifically, user computing device 120 may capture an input player video 160 using an on-device camera. At an optional step 171, a leader video may be received and analyzed to generate a leader posture feature, which may in turn be stored in local memory. Such a leader video may be part of leader data 192 as received via network 190, or may be selected from local device memory on user computing device 120. Network 190 may be connected to other user devices, NEX servers, third-party sites such as YOUTUBE and NETFLIX, and the like. At step 172, this leader posture feature or reference feature may be retrieved from memory, or received from a remote server via network 190. At step 174, input user video 160 may be analyzed via a computer vision algorithm to extract one or more posture or posture flows, and one or more user posture features may be generated based on the posture flow. In step 176, feedback 182 to player may be generated, for example by comparing the reference feature and the user feature. In addition, a set of leader data 184, which may comprise the leader video or leader posture flows, may be provided to user 115, for example via a screen on user computing device 120.

In some embodiments, the reference video in step 171 may be a real-time video stream from the leader's live-camera. In some embodiments, the leader video may be previously recorded. Similarly, input user video 160 may be live-recorded (e.g., live-streamed by an on-device camera on user device 120) as NEX system 170 is performing posture extraction and comparison. In some embodiments, input user video 160 may be previously recorded. For example, a user may want to compare his or her performance of a particular dance sequence under a given dance music with that of a dance instructor.

To analyze leader and/or user videos, a convolutional neural network (CNN) may be applied to some or all frames of a video to detect one or more individual persons, and their postures in the video, optionally with any equipment that may be present (e.g., basketballs, weights for lifting, etc.). A tracking algorithm may be performed to track all detected human poses/postures, where multiple poses/postures may be present in each frame of the video, to generate posture flows over given periods of time. In some embodiments, a flow may refer to object instances from different video frames. All object instances in the same flow may be considered the same object. In other words, for a posture or a body key point in a flow, all instances of the posture or body key point in all frames of the video may be identified as the same object. When a single player is being recorded for the game, the detected posture flow is associated with the player directly. When multiple players are being recorded for the game, the NEX system may distinguish the players based on visual features such as jersey colors or distinguishing facial or body features, and each player may register with the NEX system before the start of a game by logging in such visual features.

To detect objects of interests such as players from frames of the leader or user video, one or more convolutional neural networks (CNN) may be applied. Each CNN module may be trained using one or more prior training videos. A CNN utilizes the process of convolution to capture the spatial and temporal dependencies in an image, and to extract image features from the input video for object detection. Image feature extraction in turn enables segmentation or identification of image areas representing players, and further analysis to determine player body postures constituting body key points. A player and his or her body parts move through space when jumping, turning, stretching, kicking, etc., leading to changing locations, sizes, and body postures. An equipment may be mostly stationary (e.g., a stationary spinning machine or an elliptical machine), or may move through space and time as well (e.g., a weight being lifted, a jump rope flying through space, or a ball bouncing), with changing size and/or location from video frame to video frame.

In computer vision, pose or posture estimation is the task of identifying or detecting the position and orientation of an object in an image, relative to some coordinate system. This is generally formulated as the process of determining key point locations that describe the object. For example, hand pose estimation is the process of determining finger joints and fingertips in a given image, where the whole hand is viewed as one object. Head pose estimation is the process of determining and analyzing facial features to obtain the 3D orientation of human head with respect to some reference point. Human pose estimation is the process of detecting major part and joints of the body, such as head, torso, shoulder, ankle, knee, and wrist. In this disclosure, "posture" and "pose" are used interchangeably to refer to either or both of the image of a human player segmented from an input video, and a set of key points extracted from the image to represent the form of the player's whole body or one or more parts of the player's body. In addition, instead of only determining whether an object such as a player is present in a given video frame, object detection or extraction in the present disclosure refers to determining the relative position, size, and/or pose of a player, one or more of the player's body parts, or other entities of interest.

Once objects are detected or extracted from individual frames, object flows may be established by grouping detected objects along a timeline. Object movements across frames are continuous in the sense that object locations can only change in small increments from one video frame to the next. Thus, detected objects may be grouped based on location information into one or more object flows. For example, object flows may be established by computing a matching score for each object and existing object flow combination, and assigning objects to existing object flows with the highest matching score. At the beginning when no object flows yet exist, an initialization process may be performed based on an initial collection of a small number of objects, detected with high accuracy. In addition, a new flow may be created if the detected object does not match to any existing flows with a high score.

As will be discussed in more detail with reference to FIGS. 11A and 11B, a leader video and a corresponding player video may be segmented temporally into short clips having predetermined durations, and such segments may overlap in time. Player posture flow from each temporal segment may be compared to that in corresponding leader video segments. In some embodiments, it is assumed that the player has attempted to replicate all movements by the leader, that the player video is approximately the same length as the leader video, and that temporal segments around the same timestamp are correlated and should be compared. In some embodiments, a player input may be received by the system to indicate correlating timestamps in the leader and player videos. In some embodiments, the player can choose to initiate his or her own video recording at any timestamp of the leader video.

Implementation using Computer Program Products, Methods, and Computing Entities

Exemplary System Architecture

Figure 2:
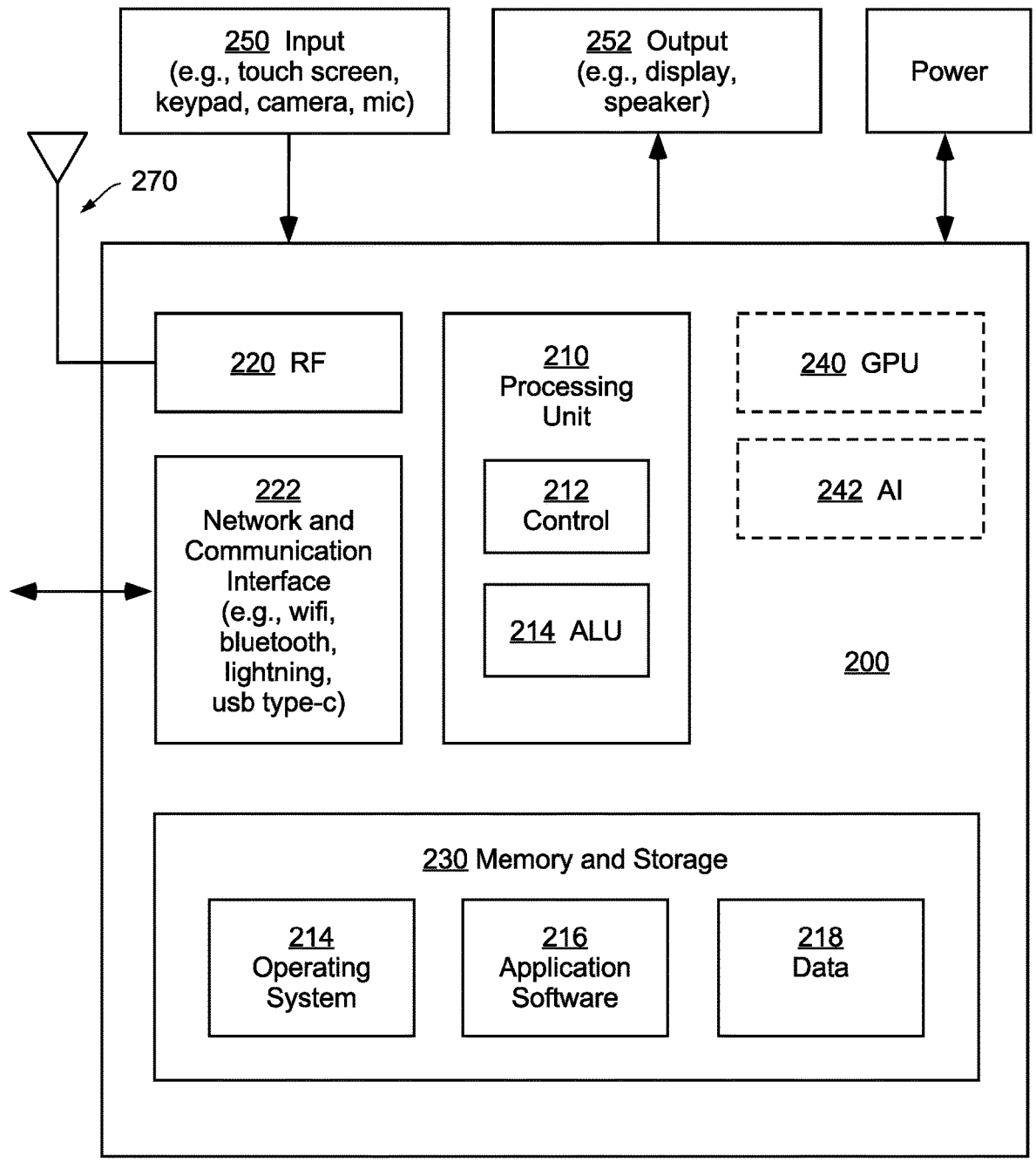
FIG. 2 is an exemplary schematic diagram of a user computing entity for implementing an interactive physical gaming system, according to exemplary embodiments of the present invention.
Figure 3:
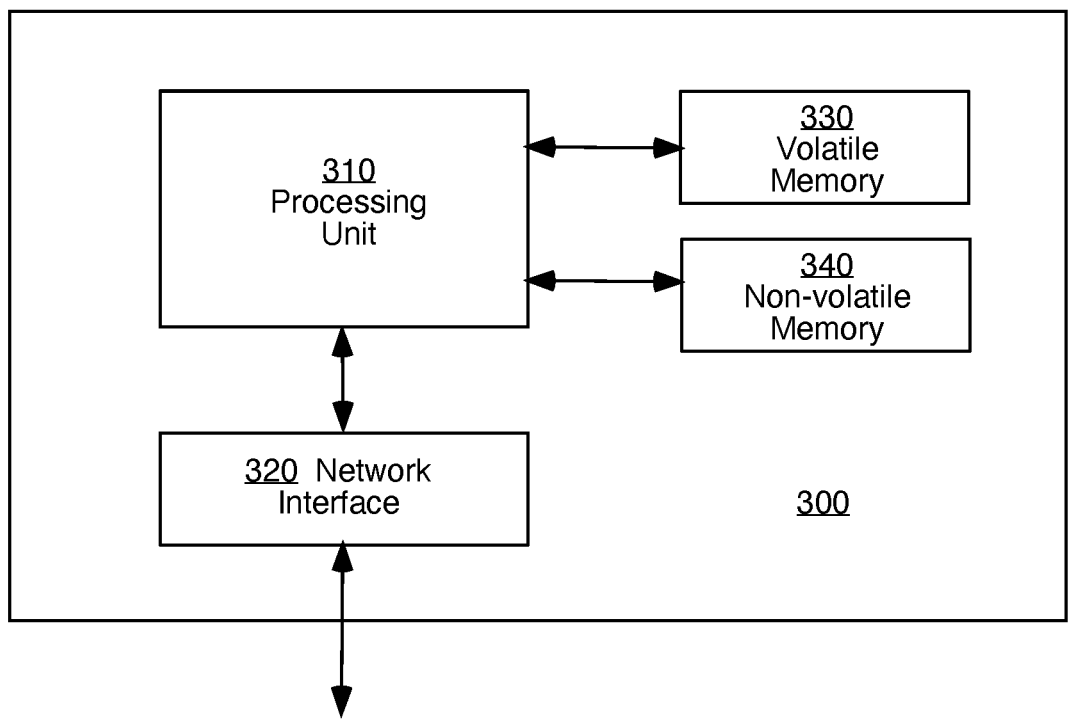
FIG. 3 is an exemplary schematic diagram of a management computing entity for implementing an interactive physical gaming system, according to exemplary embodiments of the present invention.

An exemplary embodiment of the present disclosure may include one or more user computing entities 200, one or more networks, and one or more server or management computing entities 300, as shown in FIGS. 2 and 3. Each of these components, entities, devices, systems, and similar words used herein interchangeably may be in direct or indirect communication with, for example, one another over the same or different wired or wireless networks. Additionally, while FIGS. 2 and 3 illustrate the various system entities as separate, standalone entities, the various embodiments are not limited to this particular architecture.

Exemplary User Computing Entity

FIG. 2 is an exemplary schematic diagram of a user computing device for implementing an interactive physical gaming system including a system for performing pose comparisons, according to exemplary embodiments of the present invention. A user operates a user computing device 200 that includes one or more components as shown. As will be recognized, these architectures and descriptions are provided for exemplary purposes only and are not limiting to the various embodiments.

In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, retrieving, operating on, processing, displaying, storing, determining, creating, generating, monitoring, evaluating, comparing, and/or similar terms used herein interchangeably. In various embodiments, these functions, operations, and/or processes can be performed on data, content, information, and/or similar terms used herein interchangeably. Furthermore, in embodiments of the present invention, user computing device 200 may be a mobile device, and may be operated by a user participating in an interactive physical game. On the other hand, a NEX server as discussed previously may be implemented according to the exemplary schematic diagram shown in FIG. 3, possibly in the cloud, and possibly with logically or physically distributed architectures.

As shown in FIG. 2, user computing entity 200 may include an antenna 270, a radio transceiver 220, and a processing unit 210 that provides signals to and receives signals from the transceiver. The signals provided to and received from the transceiver may include signaling information in accordance with air interface standards of applicable wireless systems. In this regard, user computing entity 200 may be capable of operating with one or more air interface standards, communication protocols, modulation types, and access types. More particularly, user computing entity 200 may operate in accordance with any of a number of wireless communication standards and protocols. In some embodiments, user computing entity 200 may operate in accordance with multiple wireless communication standards and protocols, such as 5G, UMTS, FDM, OFDM, TDM, TDMA, E-TDMA, GPRS, extended GPRS, CDMA, CDMA2000, 1xRTT, WCDMA, TD-SCDMA, GSM, LTE, LTE advanced, 5G, EDGE, E-UTRAN, EVDO, HSPA, HSDPA, MDM, DMT, Wi-Fi, Wi-Fi Direct, WiMAX, UWB, IR, NFC, ZigBee, Wibree, Bluetooth, and/or the like. Similarly, user computing entity 200 may operate in accordance with multiple wired communication standards and protocols, via a network and communication interface 222.

Via these communication standards and protocols, user computing entity 200 may communicate with various other computing entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). User computing entity 200 may also download changes, add-ons, and updates, for instance, to its firmware, software (e.g., including executable instructions, applications, program modules), and operating system.

In some implementations, processing unit 210 may be embodied in several different ways. For example, processing unit 210 may be embodied as one or more complex programmable logic devices (CPLDs), microprocessors, multi-core processors, coprocessing entities, application-specific instruction-set processors (ASIPs), microcontrollers, and/or controllers. Further, the processing unit may be embodied as one or more other processing devices or circuitry. The term circuitry may refer to an entirely hardware embodiment or a combination of hardware and computer program products. Thus, processing unit 210 may be embodied as integrated circuits, application specific integrated circuits (ASICs), field programmable gate arrays (FPGAs), programmable logic arrays (PLAs), hardware accelerators, other circuitry, and/or the like. As will therefore be understood, processing unit 210 may be configured for a particular use or configured to execute instructions stored in volatile or non-volatile media or otherwise accessible to the processing unit. As such, whether configured by hardware or computer program products, or by a combination thereof, processing unit 210 may be capable of performing steps or operations according to embodiments of the present invention when configured accordingly.

In some embodiments, processing unit 210 may comprise a control unit 212 and a dedicated arithmetic logic unit 214 (ALU) to perform arithmetic and logic operations. In some embodiments, user computing entity 200 may optionally comprise a graphics processing unit 240 (GPU) for specialized image and video rendering tasks, and/or an artificial intelligence (AI) accelerator 242, specialized for applications including artificial neural networks, machine vision, and machine learning. In some embodiments, processing unit 210 may be coupled with GPU 240 and/or AI accelerator 242 to distribute and coordinate processing tasks.

In some embodiments, user computing entity 200 may include a user interface, comprising an input interface 250 and an output interface 252, each coupled to processing unit 210. User input interface 250 may comprise any of a number of devices or interfaces allowing the user computing entity 200 to receive data, such as a keypad (hard or soft), a touch display, a mic for voice/speech, and a camera for motion or posture interfaces. User output interface 252 may comprise any of a number of devices or interfaces allowing user computing entity 200 to provide information to a user, such as through the touch display, or a speaker for audio outputs. In some embodiments, output interface 252 may connect user computing entity 200 to an external loudspeaker or projector, for audio or visual output.

User computing entity 200 may also include volatile and/or non-volatile storage or memory 230, which can be embedded and/or may be removable. A non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, DDR4 SDRAM, RDRAM, TTRAM, T-RAM, Z-RAM, RIMM, DIMM, SIMM, VRAM, cache memory, register memory, and/or the like. The volatile and non-volatile storage or memory may store an operating system 214, application software 216, data 218, databases, database instances, database management systems, programs, program modules, scripts, source code, object code, byte code, compiled code, interpreted code, machine code, executable instructions, and/or the like to implement the functions of user computing entity 200. As indicated, this may include a user application that is resident on the entity or accessible through a browser or other user interface for communicating with a management computing entity and/or various other computing entities.

In some embodiments, user computing entity 200 may include location determining aspects, devices, modules, functionalities, and/or similar words used herein interchangeably. For example, user computing entity 200 may include outdoor positioning aspects, such as a location module adapted to acquire, for example, latitude, longitude, altitude, geocode, course, direction, heading, speed, universal time (UTC), date, and/or various other information/data. In one embodiment, the location module may acquire data, sometimes known as ephemeris data, by identifying the number of satellites in view and the relative positions of those satellites. Alternatively, the location information may be determined by triangulating the user computing entity's position in connection with a variety of other systems, including cellular towers, Wi-Fi access points, and/or the like. Similarly, user computing entity 200 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

In an interactive physical game, a user computing entity 200 may be deployed (e.g., installed; configured; accepted; installed and accepted; configured and accepted; installed, configured, and accepted; or the like) in a gaming area that includes players and/or game equipment. In some embodiments, at least one input device on user computing entity 200 may collect or may be configured to collect information (e.g., data, metadata, and/or signaling) indicative of operational features of the gaming area and/or equipment for analysis by processing unit 210. For example, computer vision algorithms as implemented on user computer entity 200 may be configured to detect the location of one or more balls or goal posts in an input video as captured by an input camera device. Further, the computer vision algorithms may be used to determine the pose estimations to perform pose comparisons between users serving as followers and/or leaders.

In some embodiments, a system for an interactive physical gameplay may include: (1) At least one user computing device such as a mobile computing device and optionally a mounting apparatus for the at least one mobile computing device. The mounting apparatus may be a tripod or a kickstand, and may mount the electronic device with a camera of the user computing device positioned to monitor a gaming area. In some embodiments, the user computing device may be hand-held. (2) A sound device, for example, earbuds (e.g., wireless earbuds) or a speaker system (e.g., a public address (PA) system) coupled to the at least one user computing device. The sound device may serve to provide instruction and feedback regarding the game to one or more players. (3) Optionally, an optical device such as a projector, a laser pointing system, a jumbotron, a television screen, or the like, that can facilitate a gameplay. For example, a laser pointing system may point to a location to direct a user to position themselves, or serve as a scoreboard. In another example, the user may choose to watch leader and/or his own video on a big screen.

In some embodiments, the user computing device may communicate to external devices like other smartphones and/or access points to receive information such as software or firmware, or to send information (e.g., game data such as analytics, statistics, scores, recorded video, etc.) from the memory of the user computing device to external systems or devices such as servers, computers, smartphones, and the like.

In some embodiments, two or more users may establish a connection between their computing devices using a network utilizing any of the networking protocols listed previously. Such users may be in geographically different gaming areas. In some embodiments, the user computing devices may use a network interface such as 222 to communicate with various other computing entities, such as by communicating data, content, information, and/or similar terms used herein interchangeably that can be transmitted, received, operated on, processed, displayed, stored, and/or the like.

In some embodiments, data (e.g., game statistics, scores, video, etc.) may be uploaded by one or more user computing devices to a server such as shown in FIG. 3 when the device accesses a network connection, such as a wireless access point or hotspot. The data transfer may be performed using protocols like file transfer protocol (FTP), MQ telemetry transport (MQTT), advanced message queuing protocol (AMQP), hypertext transfer protocol (HTTP), and HTTP secure (HTTPS). These protocols may be made secure over transport layer security (TLS) and/or secure sockets layer (SSL).

In some embodiments, audio generated by a user computing device and/or audio generated by one or more users may be used to facilitate an interactive physical game. In some embodiments, audio may be used to (i) direct users to particular start postures, or particular positions on gaming areas, possibly with further audio feedback to help the users pose or locate themselves more accurately, (ii) inform users about a motion or action that a user needs to do as part of the game (e.g., shoot a ball at a basket, perform a back flip, perform an exercise such as pushups, and the like), and (iii) provide feedback to users (e.g., to inform them if they are making a wrong move, running out of time, have successfully completed a given task, or achieved a particular score); (iv) report on the progress of the game (statistics, leaderboard, eliminations, and the like), (v) report a score that characterizes the degree to which a player (e.g., follower) replicates the movements of a leader, for example, as part of the game; and (vi) provide background rhythm or music to sync leader and follower movements. In some embodiments, speech recognition and corresponding responses (e.g., audio, visual, textual, etc. responses) may also be used to facilitate the game by allowing users to set options, correct mistakes, or start or stop the game.

In some embodiments, artificial intelligence-based computer vision algorithms may be used to perform at least one of the following: (i) ensure that users are posed or located where they should be, (ii) determine when/if users successfully complete a task, action, or movement sequence, (iii) score and/or rank the quality of users' motion/actions (e.g., based the degree to which the user's motions replicate a leader's motions), and (iv) award style points or other attributes depending on the nature of the users' motion (e.g., in a game of basketball, determining whether a user scored by dunking or by performing a layup).

In various embodiments, during the physical activities performed by a user or a player, the user computing device may not be on the user's person, and instructions may be given via a speaker or other remote devices connected to the user device. Further, computer vision algorithms may be used on the user device to guide and monitor gameplay being conducted within the user device camera's field of view. Accordingly, embodiments of devices described herein can employ artificial intelligence (AI) to facilitate automating one or more gameplay features of functionalities as described herein.

To provide for or aid in the numerous determinations (e.g., determine, ascertain, infer, calculate, predict, prognose, estimate, derive, forecast, detect, compute) of game settings, player postures, player analytics, action analytics, and game analytics described herein, components described herein may examine the entirety or a subset of data to which it is granted access and can provide for reasoning about or determine states of the system or environment from a set of observations as captured via events and/or data. Determinations may be employed to identify a specific context or action, or may generate a probability distribution over states, for example. The determinations may be probabilistic. That is, the computation of a probability distribution over states of interest based on a consideration of data and events. Determinations may also refer to techniques employed for composing higher-level events from a set of events and/or data.

Such determinations may result in the construction of new events or actions from a set of observed events and/or stored event data, whether the events are correlated in close temporal proximity, and whether the events and data come from one or several event and data sources. For example, game instructions and player feedbacks may be generated from one or more player analytics derived from user game actions. Further, components disclosed herein may employ various classification schemes (e.g., explicitly trained via training data or implicitly trained via observing behavior, preferences, historical information, receiving extrinsic information, etc.) and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems may be used to automatically learn and perform a number of functions, actions, and/or determinations.

Exemplary Management Computing Entity

FIG. 3 is an exemplary schematic diagram of a management computing entity 300, such as a NEX server, for implementing an interactive physical gaming system, according to exemplary embodiments of the present invention. The terms computing entity, computer, entity, device, system, and/or similar words used herein interchangeably are explained in detail with reference to user computing entity 200.

As indicated, in one embodiment, management computing entity 300 may include one or more network or communications interface 320 for communicating with various computing entities, such as by communicating data, content, information, and/or similar terms used herein interchangeably that can be transmitted, received, operated on, processed, displayed, stored, and/or the like. For instance, management computing entity 300 may communicate with user computing device 200 and/or a variety of other computing entities. Network or communications interface 320 may utilize a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, management computing entity 300 may be configured to communicate via wireless external communication networks using any of a variety of standards and protocols as discussed with reference to user computing device 200.

As shown in FIG. 3, in one embodiment, management computing entity 300 may include or be in communication with one or more processing unit 310 (also referred to as processors, processing circuitry, processing element, and/or similar terms used herein interchangeably) that communicate with other elements within the management computing entity 300. As will be understood, processing unit 310 may be embodied in a number of different ways. For example, as one or more CPLDs, microprocessors, multi-core processors, coprocessing entities, ASIPs, microcontrollers, and/or controllers, in the form of integrated circuits, application specific integrated circuits (ASICs), field programmable gate arrays (FPGAs), programmable logic arrays (PLAs), hardware accelerators, other circuitry, and/or the like. As will therefore be understood, processing unit 310 may be configured for a particular use or configured to execute instructions stored in volatile or non-volatile memory 330 and 340. As such, whether configured by hardware or computer program products, or by a combination thereof, processing unit 310 may be capable of performing steps or operations according to embodiments of the present disclosure when configured accordingly.

Although not shown explicitly, management computing entity 300 may include or be in communication with one or more input elements, such as a keyboard, a mouse, a touch screen/display, a camera for motion and movement input, a mic for audio input, a joystick, and/or the like. Management computing entity 300 may also include or be in communication with one or more output elements such as speaker, screen/display, and/or the like.

In various embodiments, one or more of the components of management computing entity 300 may be located remotely from other management computing entity components, such as in a distributed system or in the cloud. Furthermore, one or more of the components may be combined and additional components performing functions described herein may be included in the management computing entity 300.

Machine Vision and Machine Learning Modules

As described herein, embodiments of the present invention use one or more artificial intelligence, machine vision, and machine learning algorithms or modules for analyzing user videos and facilitating pose comparisons. Various exemplary machine vision algorithms are within the scope of the present invention used for performing object recognition, gesture recognition, pose estimation, and so forth. The following description describes in detail some illustrative machine vision and machine learning algorithms for implementing some embodiments of the present invention.

Illustrative Machine Vision Architectures

Some exemplary machine vision algorithms utilize a deep learning network (DLN), for example, a convolutional neural network (CNN). Neural networks are computer systems inspired by the human brain. They can be viewed as parallel, densely interconnected computational models that adaptively learn through automatic adjustment of system parameters based on training data. Input information are modified based on system parameters when traversing through layers of interconnected neurons or nodes, to activate or trigger particular outputs. The design of a neural network refers to the configuration of its architecture or topology, or the specific arrangements of layers and nodes in the network. The applicability, utility, and optimality of a neural network, and the framework in which the neural network is deployed are often mutually interdependent. Convolutional Neural Networks utilize the process of convolution to reduce the number of model parameters involved, while successfully capturing the spatial and temporal dependencies in an image.

Figure 4:
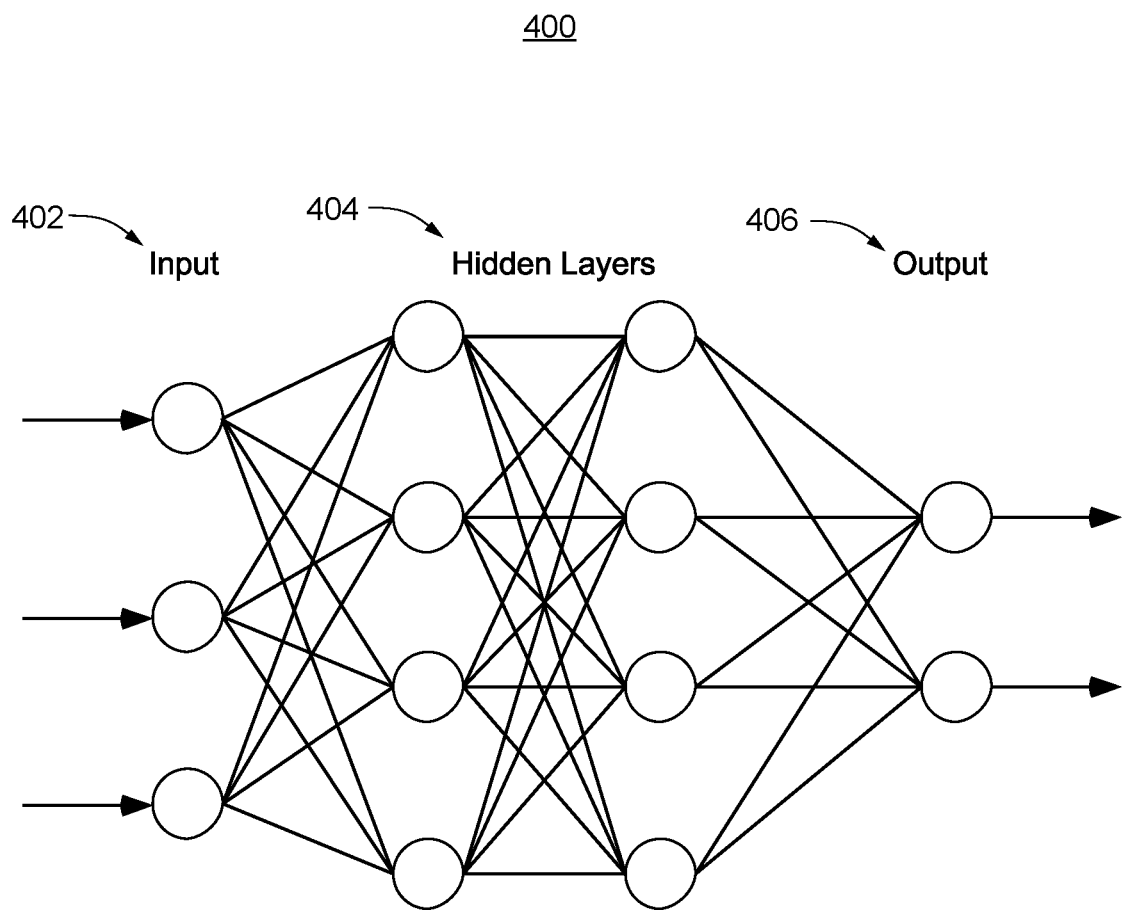
FIG. 4 shows an illustrative block diagram of a convolutional neural network (CNN) for image analysis, according to exemplary embodiments of the present invention.

More specifically, FIG. 4 shows an illustrative block diagram 400 of a convolutional neural network (CNN) for image analysis and object recognition, according to exemplary embodiments of the present invention. This exemplary CNN module 400 may be utilized for implementing various machine vision algorithms described herein. For example, it may be designed and trained to determine gestures and poses and other machine vision tasks required by the present invention, as would be recognized by one of ordinary skill in the art. An input layer 402 is connected via a multiplicity of hidden layers 404 to an output layer 406. Input layer 402 is a map for pixels of an input image. Exemplary hidden layers may include, but are not limited to, convolutional layers, Rectified Linear Units (ReLU), pooling layers, normalization layers, and fully connected layers. A convolutional layer applies a convolution or correlation operation by a kernel matrix to the input data to generate a feature map of the input image. ReLU is a non-linear activation function. Pooling layers reduce the dimensionality of the data to decrease the required computational power. A fully connected layer has full connections to all activations in the previous layer, and may be needed before classification or output activation at output layer 406. Successive convolution-ReLU-pooling stages allow the successive extraction of low-level to high-level features, from edges, general shapes such as line and circles, to specific shapes representing specific objects. As will be discussed later, FIGS. 8A to 8E provide exemplary block diagrams of a detailed neural network design for pose estimation.

FIG. 4 shows only one illustrative CNN architecture that is within the scope of the present invention, but the present invention is not limited to the use of CNNs. Other machine vision algorithms are also within the scope of the present invention.

Illustrative Machine Learning Architectures

Figure 5:
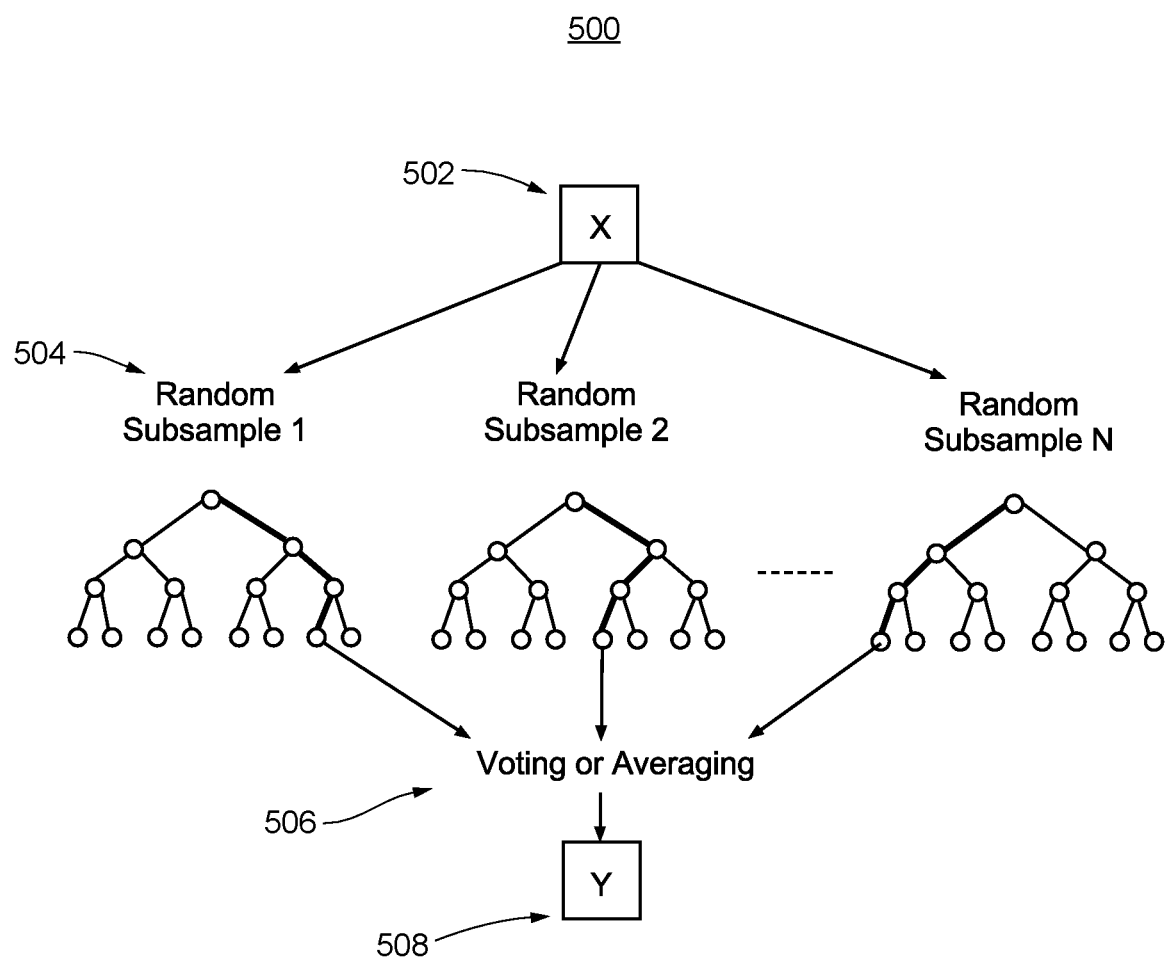
FIG. 5 shows an illustrative block diagram for a machine learning algorithm, according to exemplary embodiments of the present invention.

As states herein, various exemplary machine vision and machine learning algorithms are within the scope of the present invention for performing object recognition, gesture recognition, pose estimation, and so forth. FIG. 5 shows an illustrative block diagram 500 for a machine learning algorithm, according to exemplary embodiments of the present invention.

In particular, a supervised machine learning algorithm is shown, comprising an illustrative random forest algorithm. Random forest algorithms are a method for classification and regression. By using a multitude of decision tree predictors 504, each depending on the values of a random subset of a training data set 502, the chances of overfitting to the training data set may be minimized. The decision tree predictors are voted or averaged at a decision step 506 to obtain predictions 508 of the random forest algorithm. For the task of object recognition, input 502 to the machine learning algorithm may include feature values, while output 508 may include predicted gestures and/or poses associated with a user. In one embodiment, the random forest algorithm is implementation as described in Leo Breiman, *Random Forests*, Machine Learning, 45, 5-32, 2001, Kluwer Academic Publishers, Netherlands, available at doi.org/10.1023/A: 1010933404324. Random forest is only one illustrative machine learning algorithm that is within the scope of the present invention, and the present invention is not limited to the use of random forest. Other machine learning algorithms, including but not limited to, nearest neighbor, decision trees, support vector machines (SVM), Adaboost, Bayesian networks, various neural networks including deep learning networks, evolutionary algorithms, and so forth, are within the scope of the present invention.

In short, embodiments of devices, systems, and their various components described herein may employ artificial intelligence (AI) to facilitate automating one or more functions described herein, including object recognition, gesture recognition, and pose estimation.

Training the Machine Learning Algorithms

Figure 6:
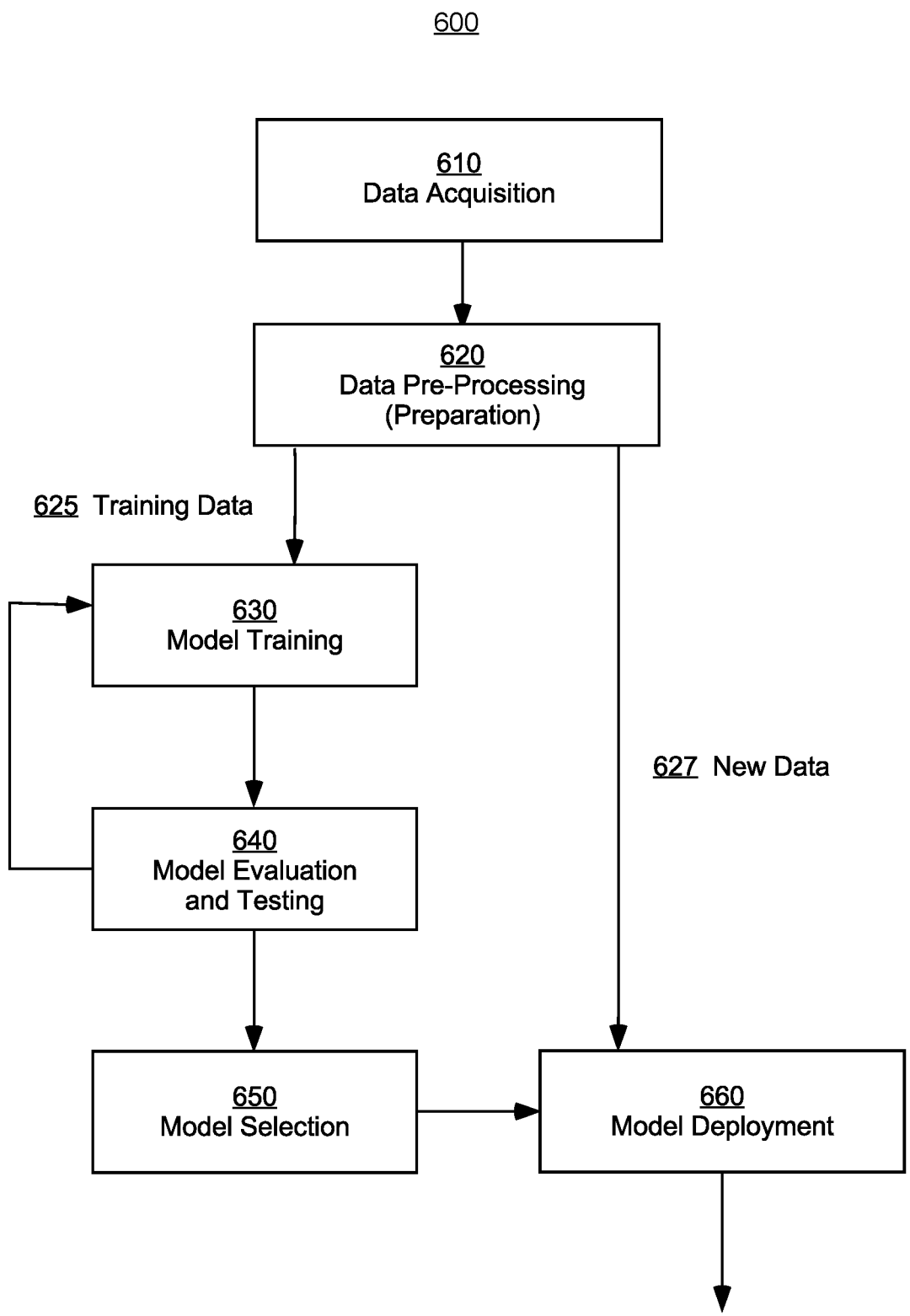
FIG. 6 shows an illustrative flow diagram for training a machine learning algorithm, according to exemplary embodiments of the present invention.

FIG. 6 shows an exemplary flow diagram 600 for training a machine learning (ML) algorithm, which may be utilized in object recognition, pose estimation, and object flow construction, according to exemplary embodiments of the present invention.

The training process begins at step 610 with data acquisition. At step 620, acquired data are pre-processed, or prepared. At step 630, a machine learning model is trained using training data 625. At step 640, the model is evaluated and tested, and further refinements to the model are fed back into step 630. At step 650, optimal model parameters are selected, for deployment at step 660. New data 627 may be used by the deployed model to make predictions.

A starting point for any machine learning method such as used by the machine learning component above is a documented dataset containing multiple instances of system inputs and correct outcomes (e.g., the training data). This data set may be used, using methods known in the art, including but not limited to standardized machine learning methods such as parametric classification methods, non-parametric methods, decision tree learning, neural networks, methods combining both inductive and analytic learning, and modeling approaches such as regression models, to train the machine learning system and to evaluate and optimize the performance of the trained system. The quality of the output of the machine learning system output depends on (a) pattern parameterization, (b) learning machine design, and (c) quality of the training database. These components may be refined and optimized using various methods. For example, the database may be refined by adding datasets for new documented gestures and poses. The quality of the database may be improved, for example, by populating the database with cases in which the gestures and/or poses were correctly recognized. In one embodiment, the database includes data, for example, of mistaken identification of gestures and/or poses, which may assist in the evaluation of a trained system.

Figure 7:
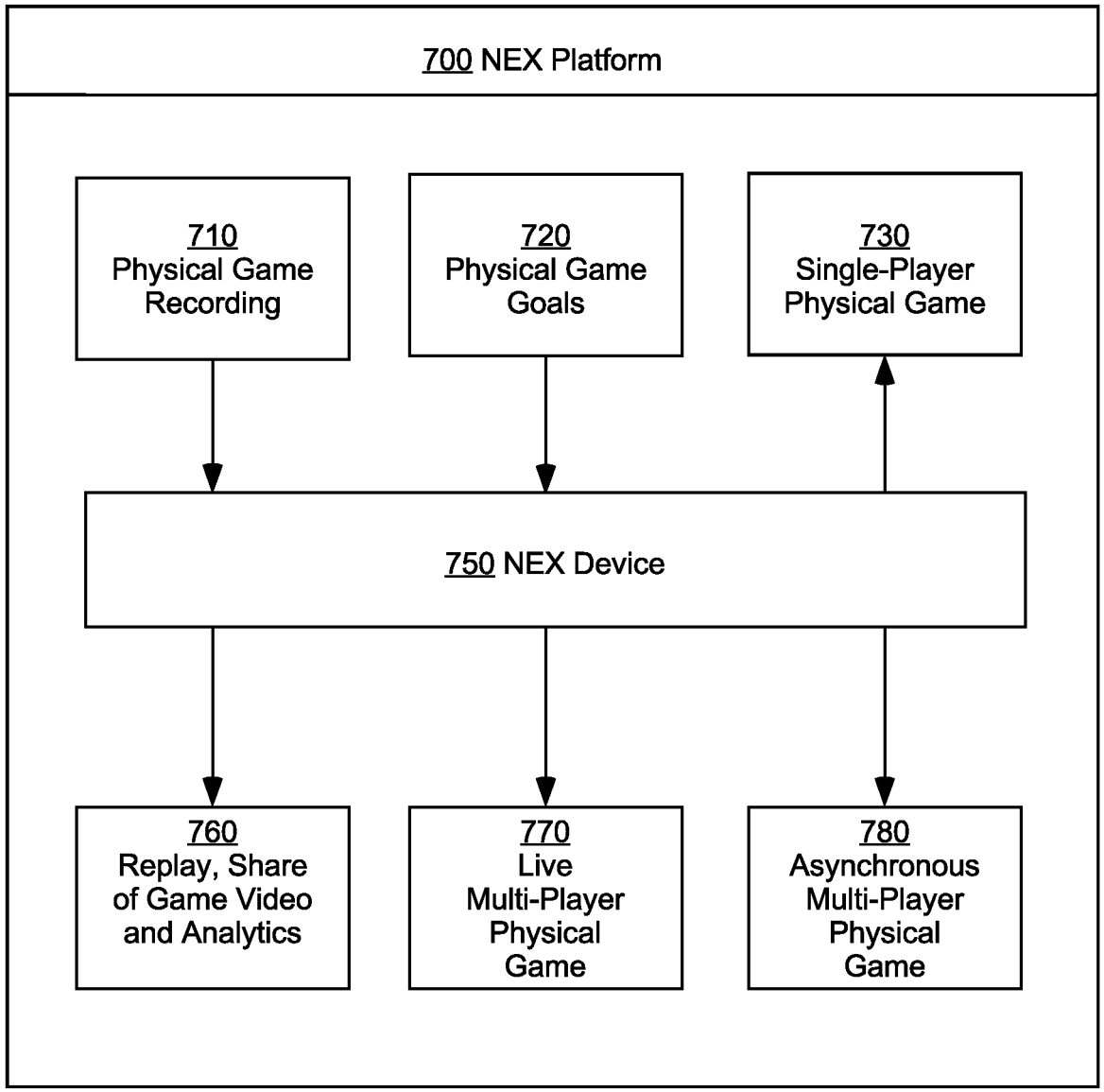
FIG. 7 is a schematic diagram illustrating a NEX platform, according to exemplary embodiments of the present invention.

FIG. 7 is a schematic diagram illustrating and summarizing some functionalities provided by an extended NEX platform 700, according to one embodiment of the present invention. In particular, a NEX device 750 may take in physical game recordings or leader videos 710, as well as physical game goals or challenges 720, and facilitate different types of interactive physical games, including single-player physical games 730, live multi-player physical games 770, and asynchronous multi-player physical games 780. In some embodiments, the NEX system may capture interactive physical games not only for player analytics and pose comparison, but also for later replay and share of user game videos and analytics 760.

Although NEX device 750 as shown in FIG. 7 serves as the core for a NEX platform 700, in some embodiments such as multi-player games, NEX platform 700 may be networked among multiple user devices, where a NEX server may be connected to multiple camera-enabled user computing devices, each used to capture user or game data, and for providing game analytics and/or pose comparison and associated results. Such game video and/or analytics data may be uploaded to the NEX server, which in term may store and facilitate sharing of such data among individual players/users.

Exemplary Convolutional Neural Networks (CNNs) for Pose Estimation

Figure 8A:
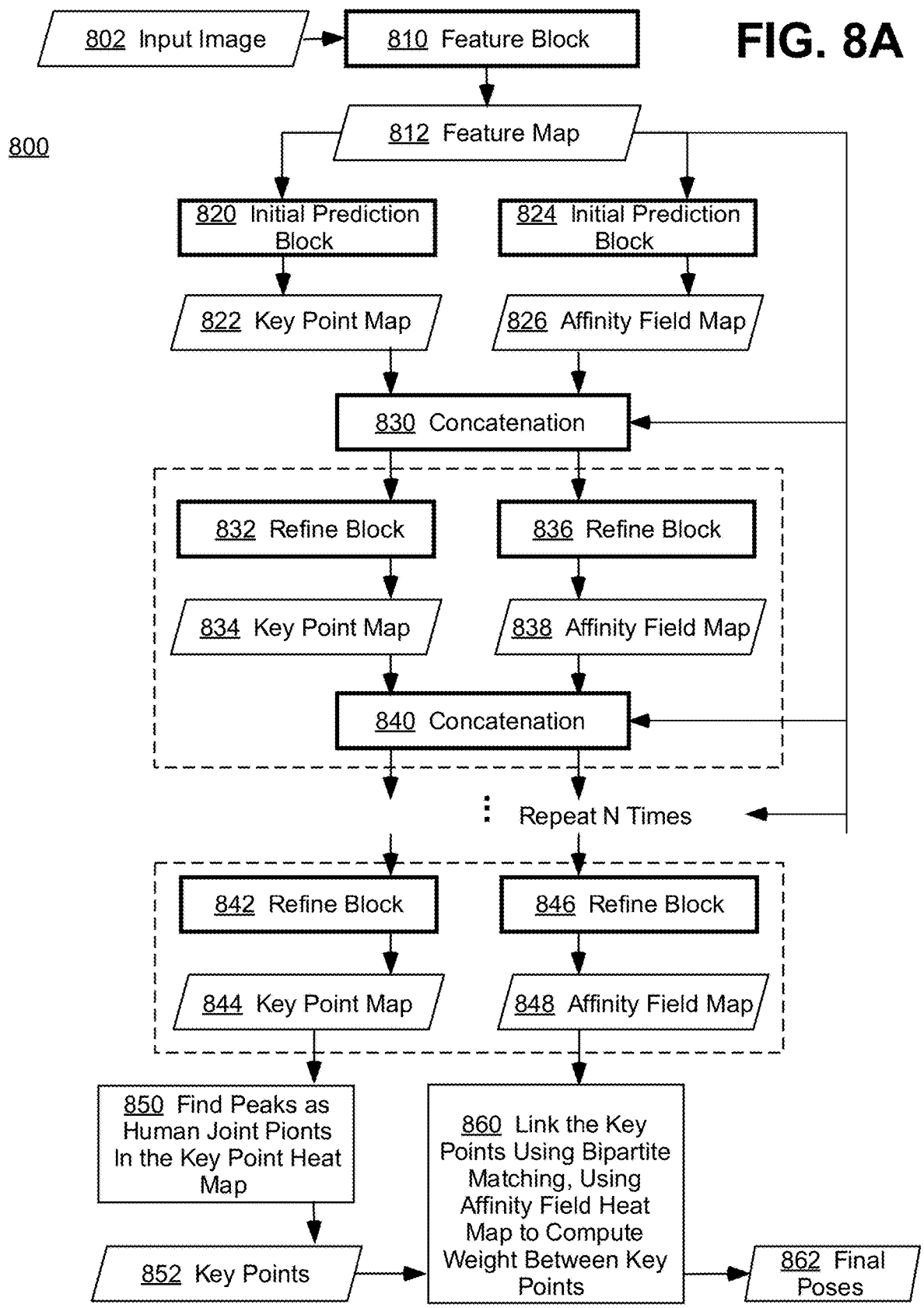
FIG. 8A is a block diagram of an exemplary neural network for pose estimation, according to exemplary embodiments of the present invention.

FIG. 8A is a block diagram 800 of an exemplary neural network for pose estimation, according to some embodiments of the present invention. Here neural network layers or blocks are drawn with thickened lines. In this illustrative example, a two-branch CNN efficiently detects poses of multiple people in an input image by predicting part confidence maps for body parts, and part affinity fields for body part-to-body part association, effectively decoupling the detection of a body part such as an arm or leg, and the assignment of the detected body part to an individual person. A part affinity field (PAF) is a 2D vector field that encodes the location and orientation of body parts including limbs over the image domain. A PAF encodes the association between body parts, where body parts belonging to the same person are linked.

The illustrative network shown in FIG. 8A performs the following steps to estimate the pose of one or more persons in an input image:

1. Use a convolutional network block as a feature extractor to compute a feature map from an input image.
2. Turn the feature map into a key point heat map and an affinity field heat map using another convolutional network block.
3. Refine the key point heat map and the affinity field heat map using yet another convolutional network block, and repeat for several times.
4. Use Rectified Linear Units (ReLU), separable convolutional layers and/or batch normalization techniques to improve the accuracy and performance of the network.
5. Compute final poses by linking the key points using the affinity field heat map.

More specifically, an input image 802 is first passed through a feature block 810 to generate a feature map 812. Initial prediction blocks 820 and 824 then extract a key point map 822 and an affinity field map 826, respectively. A concatenation operation 830 is performed before further refinements are carried out in multiple iterations. For each stage of iteration, refine blocks such as 832, 836, 842, and 846 predict refined key point maps such as 834 and 844, and refined affinity field maps such as 838 and 848, respectively. Concatenation operations such as 840 are performed to generate input for the next stage. A total of N refinements may be carried out, where N may be any positive integer. For example, N may equal to 5 in some embodiments of the present invention. After the last refinement stage, key point heat map 844 is examined in step 850 to find peaks as human joint points or key points 852. Such key points may be linked in step 860 to generate final poses 862, by performing bipartite matching using affinity field heat map 848 to compute weights between key points. In this illustrative example, key point map 844 may comprise 18 channels, while affinity field map 848 may comprise 34 channels.

FIG. 8B is a detailed block diagram illustrating an exemplary Feature Block 810, according to some embodiments of the present invention. In this example, separable convolutional layers (SCL) are deployed with different kernel and stride sizes.

Correspondingly, FIG. 8C is a detailed block diagram illustrating an exemplary separable convolutional neural network layer 870, according to some embodiments of the present invention. A depth-wise separable convolution or a separable convolution layer factorizes a conventional, full convolution operation into a first depth-wise convolution to filter the input channels, and a second point-wise convolution to combine outputs of the depth-wise network layer to build a feature map. Depth-wise separable convolutions trade significant improvements in computational efficiency for a small reduction in accuracy. Batch optimization and ReLU blocks further help improve the accuracy and performance of the network layer. Furthermore, in some embodiments, inverted residuals may be utilized to connect linear bottleneck layers between individual depth-wise separable convolutional layers, which also tradeoff computation and accuracy. Linear bottleneck layers reduce the dimensionality of the input, while inverted residuals use shortcut connections between the bottlenecks to enable faster training and better accuracy.

Figure 8D:
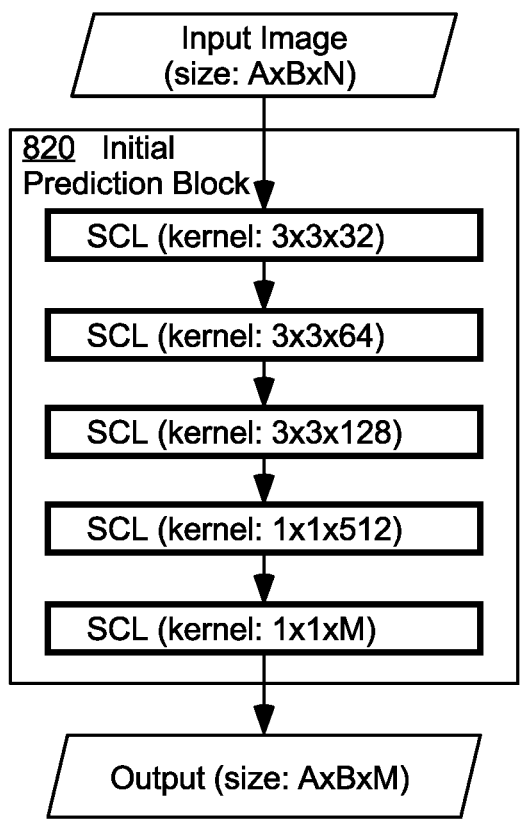
FIG. 8D is a detailed block diagram illustrating an exemplary Initial Prediction Block, according to exemplary embodiments of the present invention.
Figure 8E:
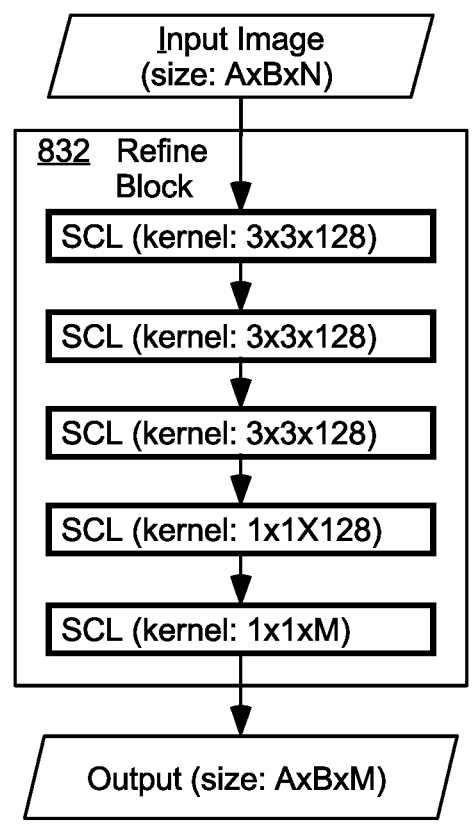
FIG. 8E is a detailed block diagram illustrating an exemplary Refine Block, according to exemplary embodiments of the present invention.
Figure 9A:
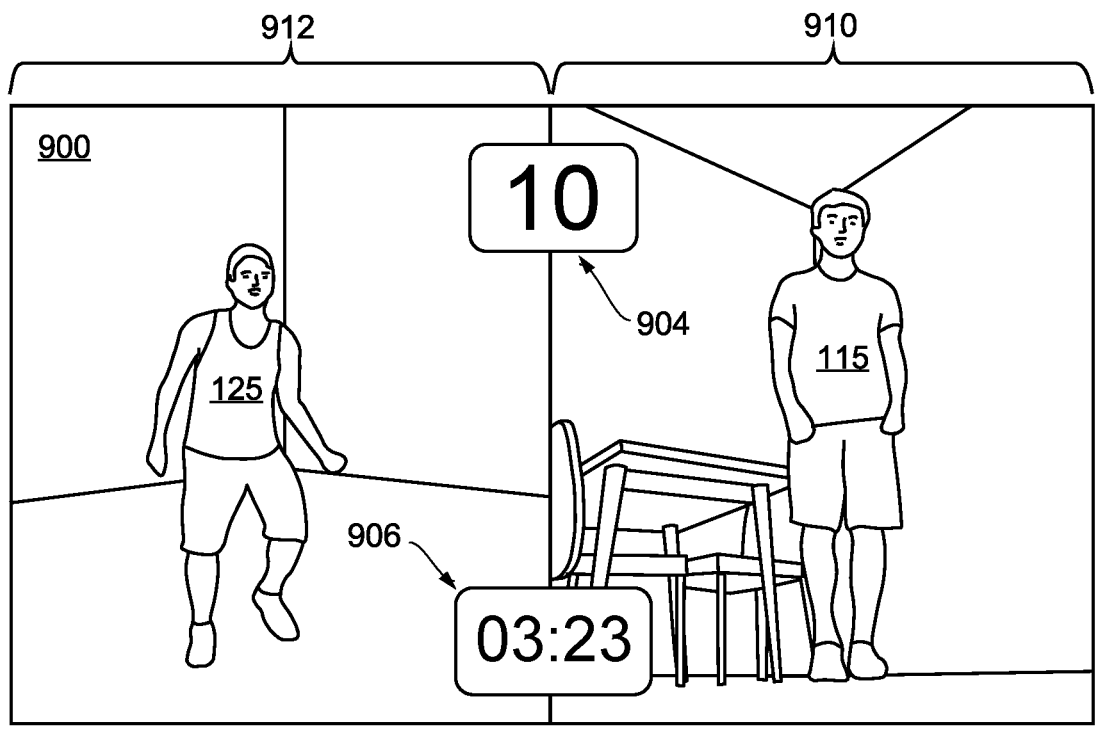
FIGS. 9A, 9B, 9C, and 9D show respective screenshots of a leader and a player performing a similar physical activity, in accordance with example embodiments of the present invention.
Figure 9B:
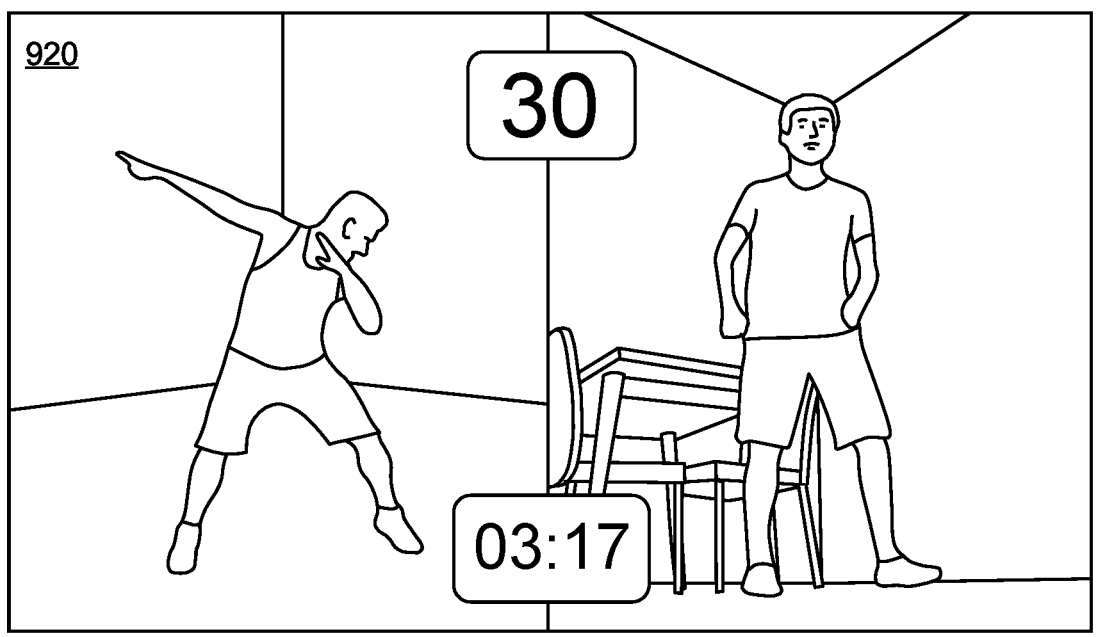
Figure 9C:
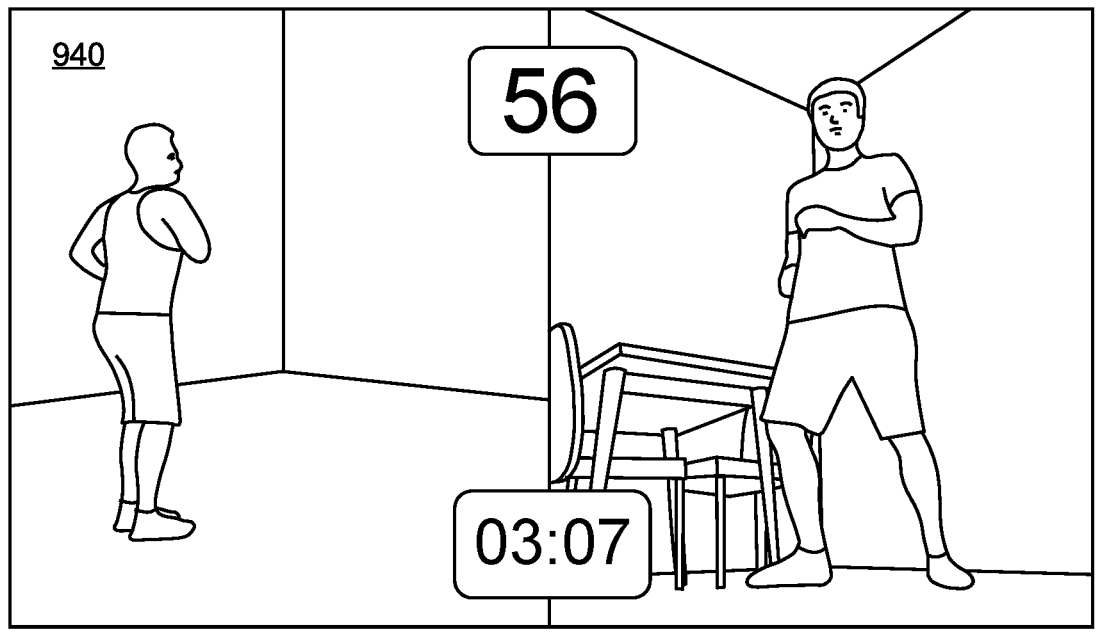
Figure 9D:
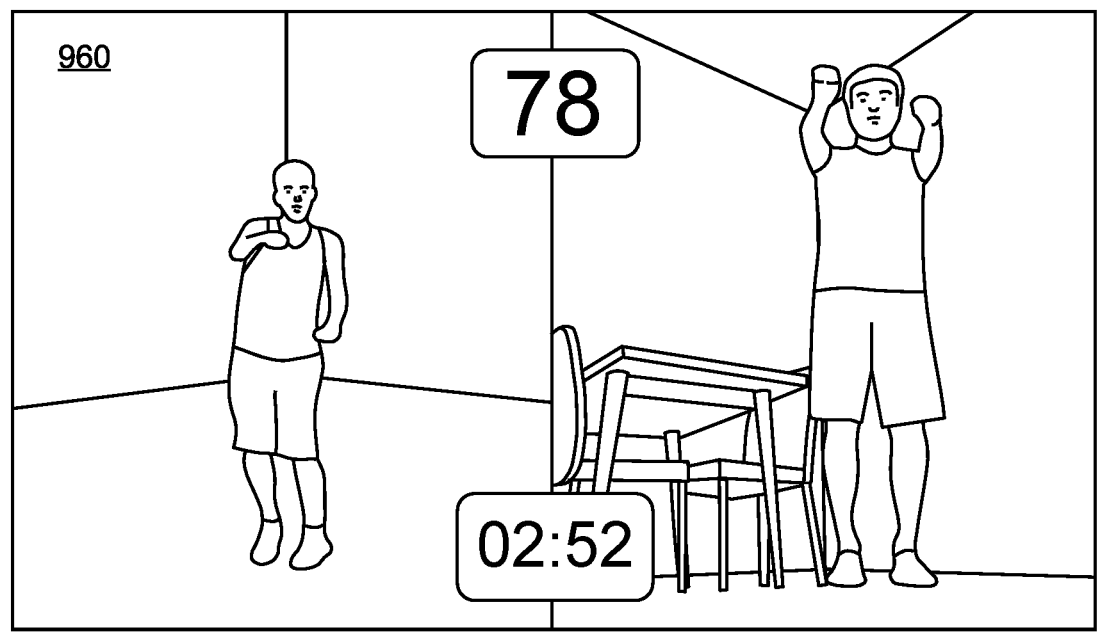

FIG. 8D is a detailed block diagram illustrating an exemplary Initial Prediction Block 820, according to some embodiments of the present invention; FIG. 8E is a detailed block diagram illustrating an exemplary Refine Block 832, according to some embodiments of the present invention. Both comprise multiple separable convolutional layers having different kernel sizes.

In some implementations of the present invention, one or more of existing software modules may be utilized, including but not limited to, CoreML for CNN object and key point detection, SceneKit for rendering an AR court, and CoreMotion for understanding a mobile device's orientation.

Pose Comparisons

In some embodiments, the disclosed systems may be configured to perform a pose comparison between different users to determine the degree to which a second user (e.g., a player) follows activities (e.g., movements) of a first user (e.g., a leader).

In some embodiments, the leader is not a user of the disclosed NEX platform, but video associated with the leader may be downloaded or streamed from any suitable third-party platform (e.g., Internet-based platform), and the disclosed NEX platform may compare the player's video recording to the leader video. In other words, the leader does not need to directly interact with the disclosed systems to upload his or her video into the NEX platform. However, for the purposes of this disclosure, both the player and the leader may be referred to as users of the system herein.

In some embodiments, the disclosed systems may include a mobile device equipped with a camera, though other devices (e.g., tablets, laptops, desktops, dedicated hardware, etc.) may also be used, and the disclosure is not limited by the choice of device. In some embodiments, the disclosed systems may be configured to play a leader's video on the player's device. In another embodiment, the player may perform an activity that attempts to largely follow (e.g., mirror to extent possible by the player) the activity depicted by the leader's video. In some embodiments, the disclosed systems may be configured to determine a score associated with the player's activity, for example, by performing a comparison of a leader video's frame with a camera video frame captured by the camera of the player's device reflecting the player's appearance while performing the activity.

FIGS. 9A, 9B, 9C, and 9D show respective diagrams representative various screenshots 900, 920, 940, and 960 associated with the system for determining pose comparisons between leader 125 and follower 115, in accordance with example embodiments of the disclosure. It is understood that there may be multiple leaders and/or followers in some exemplary embodiments, and that leader 125 may not be a direct user of the disclosed systems; rather, a video associated with leader 125 may be downloaded or streamed from any suitable third party server, a NEX database or server, or user 115's local storage for use by the disclosed systems.

The exemplary screenshots 900, 920, 940, and 960 shown in FIGS. 9A to 9D are what user 115 may see when following a dance workout video having a duration that is three and a half minutes long. On the left, a pane 912 shows an overlaid leader video, while on the right, a pane 910 is a live camera view of player 115 trying to follow leader 125's movements. A live score field 904 of the user's movements and a countdown timer field 906 are also present, in accordance with example embodiments of the disclosure. In this particular example, player 125 starts with noticeable delays in his reactions to leader 115's movements, and thus a lower score. As the leader repeats his dance moves, player 115 catches on and is able to better follow, leading to higher scores. In some embodiments, the score may be cumulative, with its value getting higher as more action sequences are completed by user 115.

In some exemplary embodiments, the left pane 912 and right pane 910 may display any selection or combination of pre-recorded and live-recorded leader and/or user videos. Examples include, but are not limited to, the following:
(1) a pre-recorded leader video and a pre-recorded player video,
(2) a pre-recorded leader video and a live-recorded player video,
(3) a live-recorded leader video and a live-recorded player video, each recorded on respective devices,
(4) a single video that has been pre-recorded or is currently live-recorded, where the leader and the player are physically present in front of the same camera system, where the single video recording is analyzed for both leader pose and player pose, and a running score or a cumulative score computed on how well the two people's movements match.

In some other exemplary embodiments, the leader video may be displayed to the user without the user video being displayed side-by-side, possibly through an external display device communicatively coupled to the user computing device. In one example, the leader video may be displayed to the user in the portrait orientation, without the user video, when the display screen on the user computing device is small and hard to view. That is, the user computing device may capture and analyze the user video without explicitly displaying it to the user. In another example, the leader video may be displayed to the user via a head-mounted display in a virtual reality (VR) or augmented reality (AR) setting, while the user computing device is placed on the side to capture and analyze the user video, to perform pose comparison between the leader and the user, and to provide feedback to the user via the head-mounted display. In this case, the leader video may be captured from behind the leader so that the user does not need to mirror the leader's movements, while the user video may be captured from either in front of or behind the user, with optional and additional corrections during posture feature calculation and comparison to adjust to video capture perspectives.

In yet some other exemplary embodiments, the user may not be watching the leader video while performing a physical activity. For example, a user may perform a known dance routine under a known background music, with a user computing device capturing a user video from afar. The user computing device may perform pose estimation and analysis in real-time to provide audio feedbacks to the user as the user is dancing. In another example, a user may watch the leader video once then repeat a demonstrated action multiple times.

Figure 10:
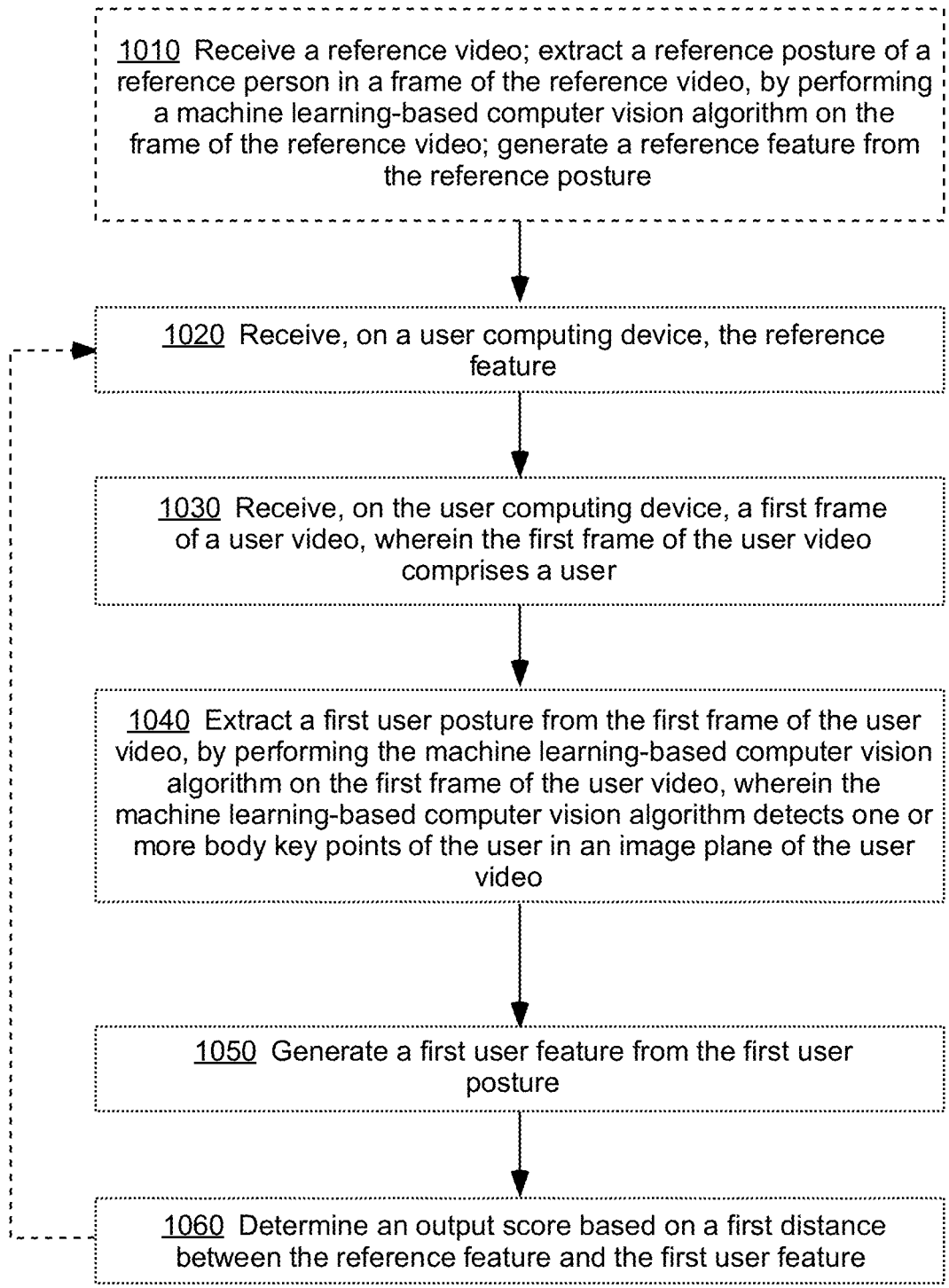
FIG. 10 shows an illustrative flowchart for an exemplary pose comparison process for interactive physical gaming, in accordance with example embodiments of the disclosure.

FIG. 10 shows an illustrative flowchart 1000 including example operations for a method of pose comparison, in accordance with example embodiments of the disclosure. In particular, at an optional step 1010, a reference video is received, where the reference video may also be known as a leader video or a target video. A reference posture of a reference person (e.g., a leader) in a frame of the reference video may be extracted, by performing a machine learning-based computer vision algorithm on the frame of the reference video. A reference feature may be generated from the reference posture. Next at a step 1020, the reference feature is received on a user computing device. At a step 1030, a frame of a user video is received on the user computing device, wherein the frame of the user video comprise a user. At step 1040, a user posture is extracted from the frame of the user video, by performing the machine learning-based computer vision algorithm on the frame of the user video, wherein the machine learning-based computer vision algorithm detects one or more body key points of the user in an image plane of the user video. At step 1050, a user feature is generated from the user posture. At step 1060, an output score is generated based on a distance between the reference feature and the user feature. The process may be repeated on consecutive or overlapping video segments as time progresses.

Figure 11A:
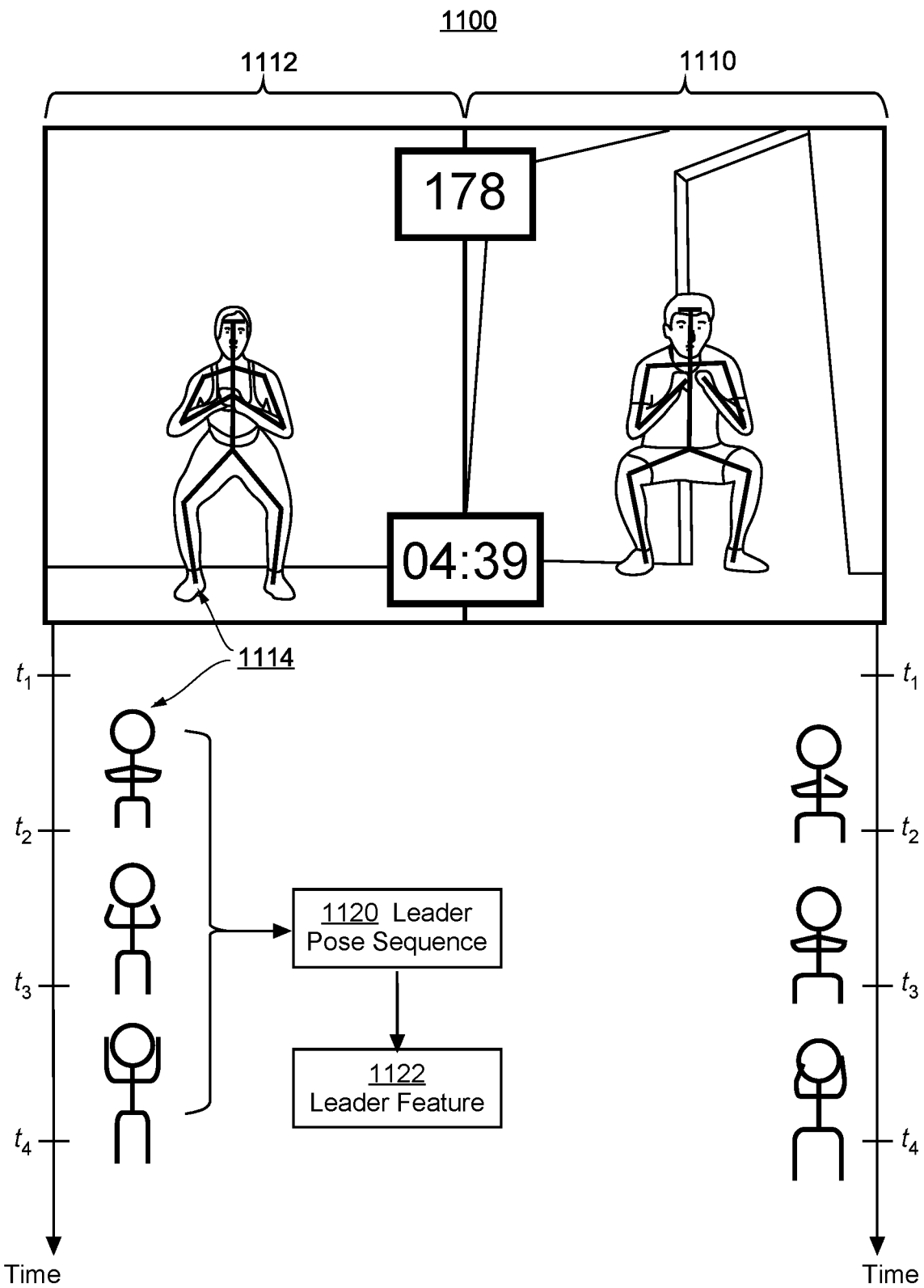
FIGS. 11A and 11B show illustrative processes for performing pose comparisons on a leader video and a player video, and for leader and player feature comparisons, in accordance with example embodiments of the present invention.
Figure 11B:
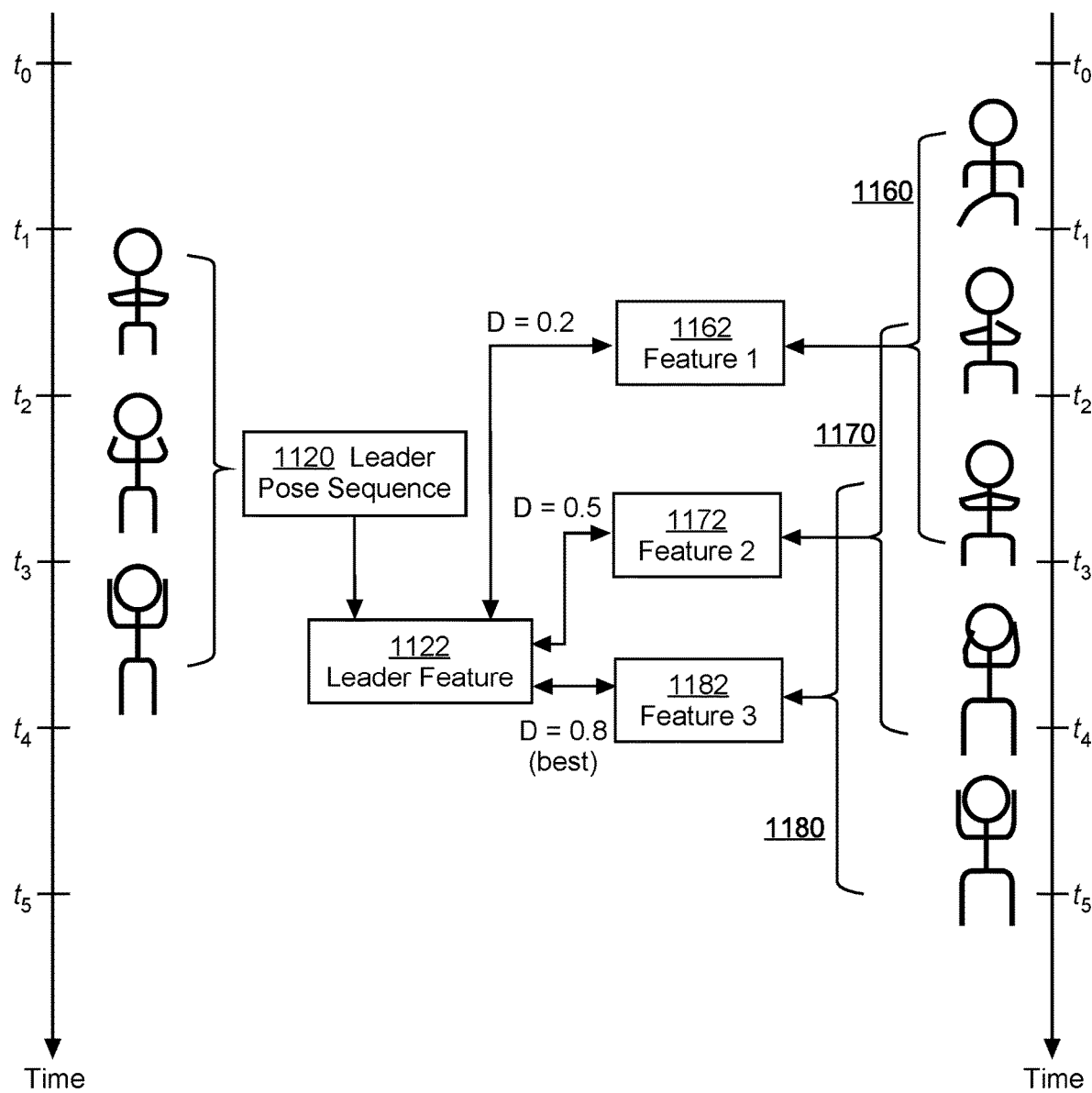

FIGS. 11A and 11B show illustrative process diagrams 1100 and 1150 for performing pose comparisons on a leader video 1112 and a user video 1110, in accordance with example embodiments of the present invention. As shown in the bottom part of FIG. 11A, the NEX platform may first perform pose estimations on a frame by frame basis, either for all frames or for a selected number of frames. For example, pose estimation may be performed on every video frame in a segment of leader video 1112, between a time $t_1$ and $t_4$, the segment spanning over a predetermined time duration (e.g., 2 seconds) or action duration (e.g., one full body stretch up from a squat). For each frame of the segment, a full body posture or pose 1114 of the leader may be estimated, and a posture flow or pose sequence 1120 may be generated using techniques as disclosed herein. A leader posture feature 1122 may then be extracted or generated from leader pose sequence 1120.

In some embodiments, for a given human posture or posture flow, a feature or posture feature is a numerical or quantitative characterization of the posture or posture flow, different from a simple scale-normalized version of the original posture or posture flow. In some embodiments, a posture feature is a quantitative measure or abstraction of a posture or posture flow, independent of the person's body characteristics such as weight, height, gender, body shape, arm and leg lengths, waist to hip ratio, and the like. For example, a posture feature vector may represent limb angles relative to the person's torso or relative to each other, as calculated based on estimated body key points. Another posture feature vector may indicate one or more alignment factors for the head, the spine (e.g., cervical, thoracic, and lumbar curvatures), the pelvis, lower body joints (e.g., hip, knee, ankle), as well as shoulder symmetry. Such posture features are suitable for characterizing static poses. In some embodiments, a posture feature is a quantitative measure of the person's movement through not only space, but also time. For example, a posture feature vector may represent a set of normalized movement coordinates of the person's arms and hands over a 2-second time period. Such a posture feature may indicate whether the person has correctly made a classic swan arm movement, instead of simply lifting her arms up and down. Another simple posture feature could be a sample variance measure of a body key point position over a given period of time, as an indication of whether the person had made sufficient amount of movements, regardless of how the movements were made. Such a posture feature may be useful in use cases such as weight loss training programs and toddler dance classes.

FIG. 11A shows pose estimation and posture feature generation being performed in real time on the leader video while a user video is displayed, showing a user or player replicating the leader's movements. In some embodiments, such pose estimation may be performed previously off-line, and pose sequence 1120 and/or leader feature 1122 may be bundled with leader video 1112 as leader data or video metadata. In some embodiments, leader pose estimation results and/or generated posture features may be downloaded to the user device without the leader video itself. For example, a VR system may be setup so that a virtual leader is displayed based on the leader pose sequence, without the original leader video. Similarly, user pose estimation results and/or posture features may be previously generated and bundled with the user video as user data or video metadata. For example, a user may compare his own dance clips with those by different professional dancers, or his basketball shots with those by several famous basketball players.

Diagram 1150 in FIG. 11B illustrates how pose estimation may be applied to individual frames of user video 1110, and different user pose sequences 1160, 1170, and 1180 corresponding to different time intervals from the user's or player's video may be generated from the pose estimations. Such time intervals may have the same time duration as the leader pose sequence, but with different start and stop times. Player posture features 1162, 1172, and 1182 may then be computed respectively from the various player pose sequences.

Next, the NEX platform may determine distances between leader posture feature 1122 and player or user posture features 1162, 1172, and 1182, each associated with a different portion of the user video as grouped through a "sliding-window" that may capture the user's reaction time to seeing the leader's movements, or minor asynchronicities between the leader and the user's movements. The size of this sliding window may depend on the type of physical activity being performed, the length and/or framerate of the input videos, a chosen sampling rate of the input videos, the computational or battery power available on the user computing device, and other similar factors.

Thus, in some embodiments, the NEX platform may perform multiple posture feature comparisons to find a user posture feature that best matches a given leader posture feature. In the example shown in FIG. 11B, user posture feature 1182 best matches the given leader posture feature 1122, with user posture feature 1182 generated from user pose sequence 1180 that is slightly time-delayed from leader pose sequence 1120.

In some embodiments, the disclosed systems may determine a highest distance metric (or lowest distance metric, depending on the conventions defined) to represent the best match. In some embodiments, the disclosed systems may generate a score based on comparisons which may be updated periodically (e.g., every second). At the end of a particular activity, a cumulative or normalized final score representing a degree of similarity between the user's movements and the leader's movements may be displayed to user, the final score being based on running distances of best matches over the entire durations of the input videos.

In some embodiments, the disclosed systems may compute a posture feature from a pose sequence via example operations described below. In particular, the disclosed systems may perform any suitable algorithm for extracting posture features associated with the pose estimations. It is notable that there is not only one way for extracting posture features, but rather many suitable techniques that may be used and the present disclosure is not limited hereby. In particular, the disclosed systems may implement different feature extraction techniques for different use cases.

In one example, a first algorithm may be used to determine posture features associated with static poses. In another embodiment, the disclosed systems may extract an angle of pose limbs (e.g., relative a the torso). The disclosed systems may then put the extracted angles in a vector which may be used as the feature. Such a static pose feature extraction technique may be used for use cases such as yoga.

In another example, a second algorithm may be used to determine features associated with relative movements between portions or parts of a person's body. In one embodiment, the disclosed systems may determine, for each set of one or more body key points or node types (e.g., a portion of the user's body such as a wrist, or an arm as indicated by the wrist and corresponding elbow on the same arm), a trajectory (e.g., the wrist trajectory, the arm trajectory) in a given time interval. The trajectory may be represented as a list of coordinates or coordinate tuples. These coordinates may be normalized by subtracting their mean respectively then dividing by their standard deviation. The disclosed systems may then be configured to directly use the normalized coordinates as the feature. Such a dynamic pose feature extraction technique may be used for use cases such as dance activities.

In yet another example, a third algorithm may be used to determine features associated with casual movements of the player that loosely resemble those of the leader's motions. In one embodiment, the disclosed systems may, for each set of one or more body key points or node types (e.g., a portion of the user's body), take a node's trajectory in a given time interval and represent the trajectory as a list of coordinates. The disclosed systems may directly compute a variance of the trajectory's coordinates as the feature. In this way, the disclosed systems may be configured to ignore the exact nature of the player's motion. Rather, as long as the player moves (in any way) and the leader moves also, the player may obtain a positive score. Such a casual pose feature extraction technique may be used for use cases such as kids' dance activities, which may not be a close replication of the leader's motions.

In various embodiments, the disclosed systems may determine the distance between features using any suitable technique. For example, the disclosed systems may use a Euclidean distance of the features in the corresponding feature space, with each feature being a relatively high-dimensional vector. Alternatively, the disclosed systems may use other metrics to replace the Euclidean distance. In some embodiments, the disclosed systems may be configured to add a condition and/or weights to the distance measurements, to add a bias on different body parts of user's movements. For example, the disclosed systems may add a weight selectively based on whether a given body part is moving frequently (e.g., beyond a first threshold amount) by the leader. In another example, the disclosed systems may add weight selectively based on whether the body part position is significantly different (e.g., has a distance beyond a second threshold) from a reference pose (e.g., a player's lazy standing pose). In this way, the disclosed systems may be configured (e.g., by a user via a user setting inputted to the disclosed systems) to add additional score on a movement which is more complex and/or non-trivial as compared with relatively simple motions (e.g., linear motions such as raising a hand). In some embodiments, the disclosed systems may use a machine learning technique such as a neural network to output the distance between any two feature vectors variously described herein.

In some embodiments, the disclosed systems may be configured to determine a final score from various scores determined throughout the course of an activity that is being implemented over a predetermined duration, as further described below. By way of background, note that process steps discussed with reference to FIG. 11B was described as including an example in which the disclosed systems take a latest-pose sequence from the leader's pose estimation results spanning over a time duration (e.g., an approximately 2 second). The disclosed systems may continue to perform pose estimation or extraction periodically while the leader video is playing, and poses over predetermined time durations are grouped into pose sequences for posture feature generation. For example, pose extraction may be performed every frame or every $2^{nd}$ or 5th frame, depending on how fast the person is moving, or how much computational or battery power the user device has remaining, and estimated poses for a consecutive or non-consecutive 60-frame long window may be grouped together into a pose sequence, with configurable stride sizes as the window slides in time. This time duration of 60 frames or 2 seconds (e.g., 30 frames per second) may be adjustable; for example, the duration may be longer or may be shorter. Accordingly, for every 2-second sequence, the disclosed systems may determine a best match in the player's pose sequence and output a score. Accordingly, in a given video, the disclosed systems may be configured to accumulate the score to a total score and display the total score to the user. In another embodiment, the disclosed systems may be configured to generate multiple scores for multiple users. In particular, the disclosed systems may output multiple scores, for example, by computing scores for different portions of the users' bodies (e.g., computing a leg score and an arm score separately), such that the user can be informed, for example, via a display of the user's device, that a given portion of his or her body is performing an activity better or worse than a different portion.

In some embodiments, the disclosed systems may be used for activities of a wide variety of applications. The disclosed systems are understood to not be limited by the nature of the physical activity. Sample use cases for the disclosed systems may include, but not be limited to, yoga, dancing with music, preschool education (on body movement), fitness, sports, physiotherapy, music instrument training and practice with focuses on hand and figure poses, sign language or military hand and arm signaling training, combinations thereof, and/or the like. In some embodiments, the disclosed systems may be configured to establish a platform for a user to upload his or her video, the video including content in which a leader may teach a skill or to provide entertainment.

In some embodiments, the disclosed systems may include a leader video production feature. In particular, the disclosed systems may provide a graphically-based tool (e.g., via an application) including a user interface. The disclosed systems tool may be configured to allow a user to upload and/or record their video as a leader video. The disclosed systems may thereby serve as a platform for any user to follow any other user's leader video production. In some embodiments, the disclosed systems may allow for or otherwise facilitate the curation of content in the videos. Such curated content may thereby allow users to better discover interesting content among all uploaded content.

In some embodiments, the disclosed systems may be configured such that pose estimation of the leader video may be pre-processed and saved during leader video recording/uploading, rather than during a game play time. This may be performed in a background process offline, which may thereby reduce the computational burden on the disclosed systems during real time operation.

Other Exemplary Embodiments

Figure 12A:
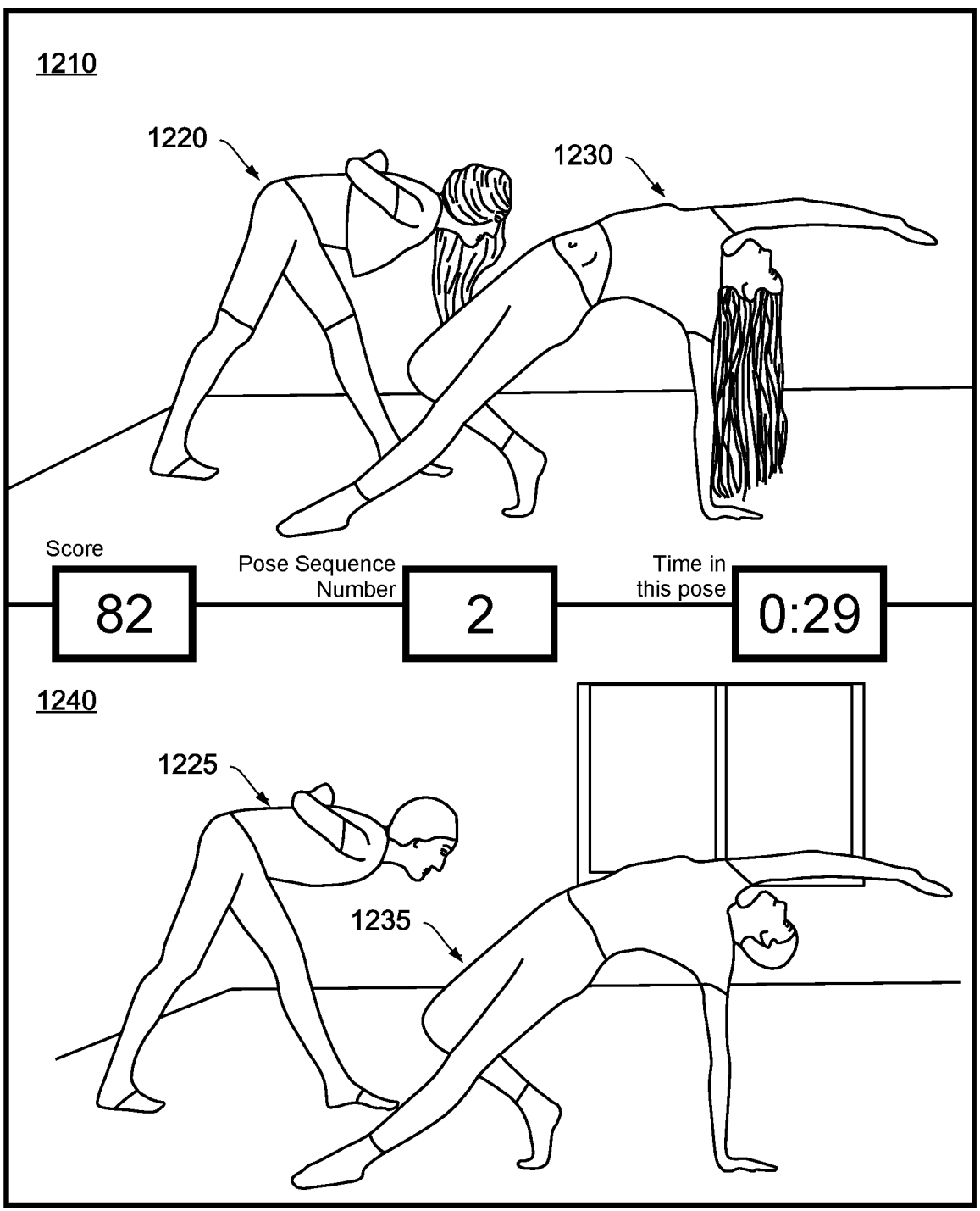
FIGS. 12A and 12B show respective illustrative screenshots of an interactive, two-player, partner yoga game, in accordance with example embodiments of the present invention.
Figure 12B:
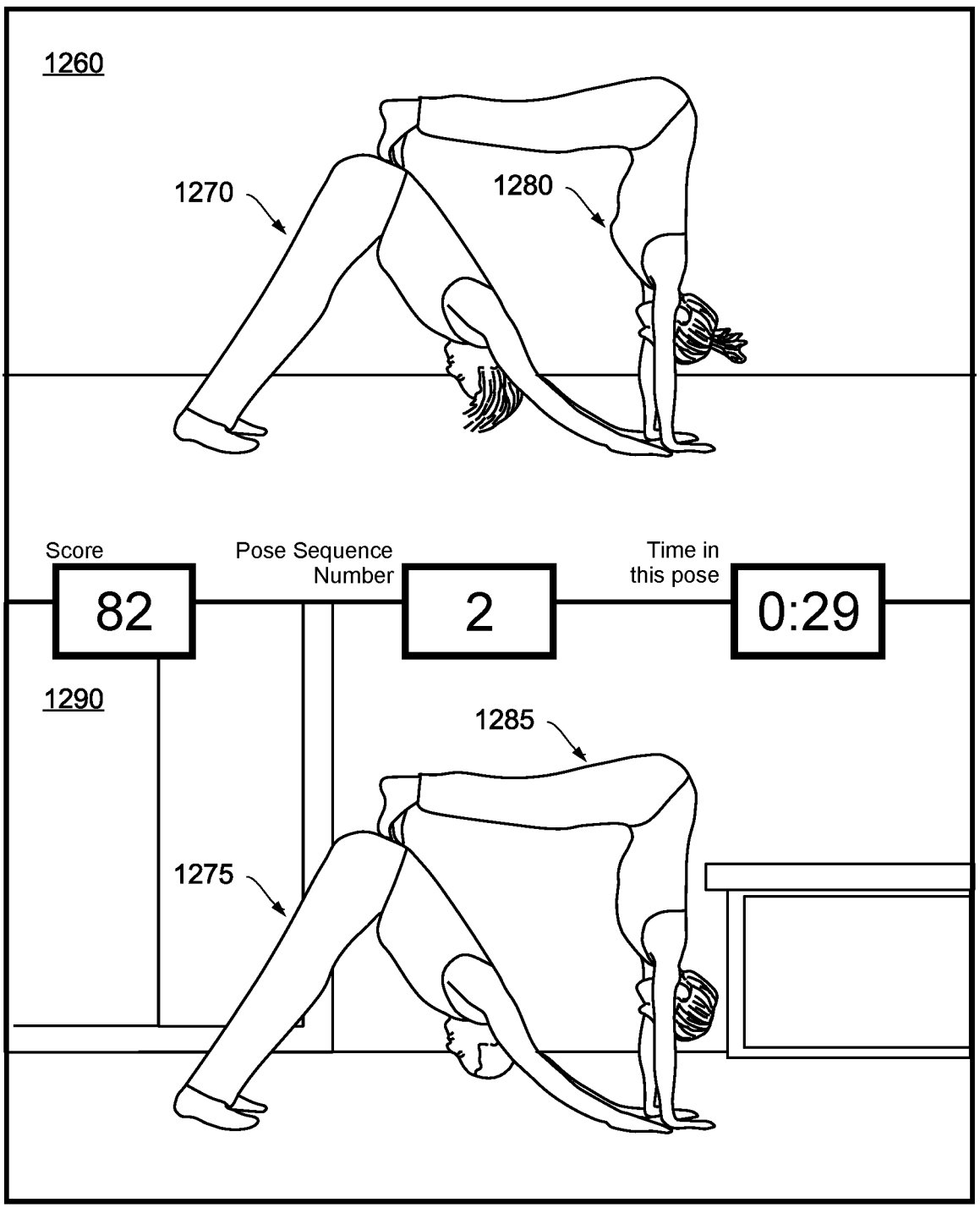

FIGS. 12A and 12B show illustrative screenshots 1200 and 1250 of an interactive, two-player, partner yoga game, in accordance with example embodiments of the present invention.

In FIG. 12A, a leader video 1210 and user video 1240 are displayed side-by-side. Two leaders 1220 and 1230 are present in leader video 1210, while two users 1225 and 1235 are attempting to replicate the leaders' yoga poses. Analytics may be generated and reported to the users, with examples including but not limited to, a pose similarity score, a pose sequence or index number, and a count-up or count-down timer for a given pose. In some other embodiments, a single user may be present in user video 1240, with the user having a choice to replicate one of the two leaders 1220 and 1230. In some other embodiments, the two users 1225 and 1235 may be present at different physical locations, with two input user videos each compared to the leader video separately. Similarly, various embodiments of the present invention may be deployed in exemplary use cases involving a single leader and multiple followers (e.g., dance workout), multiple leaders and a single follower (e.g., a dance workout with 3 instructors doing the same moves, with the player compared to any one or a selected one of the instructors), and multiple leaders with multiple followers.

In FIG. 12B, a leader video 1260 and user video 1290 are displayed side-by-side. Two leaders 1270 and 1280 are present in leader video 1260, while two users 1275 and 1285 are attempting to replicate the leaders' yoga pose. Analytics may be generated and reported to the users, with examples including but not limited to, a pose similarity score, a pose sequence or index number, and a count-up or count-down timer for a given pose. In this particular example, each of the two-person combinations or teams may be viewed as a single "leader" or a single "user" respectively, and the corresponding two-person combinational posture may be viewed as a single "posture" for the purposes of posture analysis and extraction. Thus, a posture feature may be generated from a two-person combinational posture estimation, based on relative limb and torso angles among the two participants, and used for pose comparison between the leader team and the user team. Such analyses are suitable for synchronized team activities such as partner yoga, ball room dancing, synchronized diving, acrobatics, and the like. Alternatively, pose comparisons may be done on a person-by-person basis, then combined, with or without weightings, to generate an overall pose comparison score.

Conclusions

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every end-user device is accommodated by the server to practice the methods of the present invention.

The present invention may be implemented in hardware and/or in software. Many components of the system, for example, signal processing modules or network interfaces etc., have not been shown, so as not to obscure the present invention. However, one of ordinary skill in the art would appreciate that the system necessarily includes these components. A computing device, as illustrated in FIG. 2, is a hardware that includes at least one processor coupled to a memory. The processor may represent one or more processors (e.g., microprocessors), and the memory may represent random access memory (RAM) devices comprising a main storage of the hardware, as well as any supplemental levels of memory, e.g., cache memories, non-volatile or back-up memories (e.g., programmable or flash memories), read-only memories, etc. In addition, the memory may be considered to include memory storage physically located elsewhere in the hardware, e.g., any cache memory in the processor, as well as any storage capacity used as a virtual memory, e.g., as stored on a mass storage device.

The hardware of a computing device also typically receives a number of inputs and outputs for communicating information externally. For interface with a user, the hardware may include one or more user input devices (e.g., a keyboard, a mouse, a scanner, a microphone, a camera, etc.) and a display (e.g., a Liquid Crystal Display (LCD) panel). For additional storage, the hardware may also include one or more mass storage devices, e.g., a floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. Furthermore, the hardware may include an interface to one or more networks (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces to communicate with each other.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

The hardware operates under the control of an operating system, and executes various computer software applications, components, program code, libraries, objects, modules, etc. to perform the methods, processes, and techniques described above.

In general, the method executed to implement the embodiments of the invention may be implemented as part of an operating system or a specific application, component, program, object, module, or sequence of instructions referred to as "computer program(s)" or "program code(s)." The computer programs typically comprise one or more instructions set at various times in various memory and storage devices in a computing device or computer, and that, when read and executed by one or more processors in the computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMS), Digital Versatile Disks, (DVDs), etc.), and digital and analog communication media.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (for example, pre-established or fixed) or dynamic (for example, created or modified at the time of execution).

Software components may invoke or be invoked by other software components through any of a wide variety of mechanisms. Invoked or invoking software components may comprise other custom-developed application software, operating system functionality (for example, device drivers, data storage (for example, file management) routines, other common routines and services, etc.), or third-party software components (for example, middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A method for pose comparison on a user computing device, comprising:
   receiving, on the user computing device, a reference feature generated from a frame of a reference video, wherein the frame of the reference video comprises a reference person, and wherein the reference feature is computed from a reference posture of the reference person in the frame of the reference video;
   receiving, from a camera connected to the user computing device, a first frame of a user video, wherein the first frame of the user video comprises a user;
   extracting a first user posture from the first frame of the user video, by performing a convolutional neural network (CNN) algorithm on the first frame of the user video, wherein the CNN algorithm detects one or more body key points of the user in an image plane of the user video, and wherein the CNN algorithm has been trained using one or more training videos;
   generating a first user feature, comprising a posture feature vector, from the first user posture based on a) a trajectory of the one or more body key points associated with a portion of the user's body and b) a variance computed using coordinates associated with the trajectory, wherein the generating the first user feature from the first user posture is further based on a plurality of limb angles relative to a torso of the user, and wherein the plurality of limb angles is determined based on the first user posture;
   determining a first output score based on a first distance between the reference feature and the first user feature, wherein the first distance is determined based on a weight associated with a portion of the user's body, and wherein the weight is determined based on a degree of motion associated with the portion of the user's body; and
   determining a second output score greater than the first output score based on a determination that the degree of motion is greater than a threshold.

2. The method of claim 1, wherein the user computing device is a mobile computing device.

3. The method of claim 1, wherein the user video is live-streamed.

4. The method of claim 1, further comprising:
   receiving, on the user computing device, the reference video;
   extracting the reference posture of the reference person in the frame of the reference video, by performing the CNN algorithm on the frame of the reference video; and
   generating the reference feature from the reference posture.

5. The method of claim 1, further comprising:
   extracting a second user posture from a second frame of the user video, by performing the CNN algorithm on the second frame of the user video; and
   generating a second user feature from the second user posture,
   wherein the determining the output score is further based on a second distance between the reference feature and the second user feature.

6. The method of claim 1,
   wherein the first frame of the user video is one frame in a plurality of frames of the user video,
   wherein the first user posture is one posture in a user posture flow extracted from the plurality of frames using the CNN algorithm, and
   wherein the first user feature is generated from the user posture flow.

7. The method of claim 6, wherein the plurality of frames of the user video spans over a predetermined time duration.

8. The method of claim 1, wherein the generating the first user feature from the user posture further comprises:
   normalizing the user feature by subtracting a mean of the user feature's vector components from each vector component, and dividing by a standard deviation of the vector components.

9. A device for pose comparison, comprising:
   a processor; and
   a non-transitory physical storage medium for storing program code accessible by the processor, the program code when executed by the processor causes the processor to:
   receive a reference feature generated from a frame of a reference video, wherein the frame of the reference video comprises a reference person, and wherein the reference feature is computed from a reference posture of the reference person in the frame of the reference video;
   receive, from a camera connected to the device, a frame of a user video, wherein the frame of the user video comprises a user;
   extract a first user posture from the frame of the user video, by program code to perform a convolutional neural network (CNN) algorithm on the frame of the user video, wherein the CNN algorithm detects one or more body key points of the user in an image plane of the user video, and wherein the CNN algorithm has been trained using one or more training videos;
   generate a first user feature, comprising a posture feature vector, from the first user posture based on a) a trajectory of the one or more body key points associated with a portion of the user's body and b) a variance computed using coordinates associated with the trajectory, wherein the generating the first user feature from the first user posture is further based on a plurality of limb angles relative to a torso of the user, and wherein the plurality of limb angles is determined based on the first user posture;
determine a first output score based on a first distance between the reference feature and the first user feature, wherein the first distance is determined based on a weight associated with a portion of the user's body, and wherein the weight is determined based on a degree of motion associated with the portion of the user's body; and
determine a second output score greater than the first output score based on a determination that the degree of motion is greater than a threshold.

10. The device of claim 9, wherein the device is a mobile computing device.

11. The device of claim 9, wherein the user video is live-streamed.

12. A non-transitory computer-readable physical storage medium for pose comparison, the storage medium comprising program code stored thereon, and the program code when executed by a processor causes the processor to:
receive a reference feature generated from a frame of a reference video, wherein the frame of the reference video comprises a reference person, and wherein the reference feature is computed from a reference posture of the reference person in the frame of the reference video;
receive, from a camera, a frame of a user video, wherein the frame of the user video comprises at least a user;
extract a first user posture from the frame of the user video, by program code to perform a convolutional neural network (CNN) algorithm on the frame of the user video, wherein the CNN algorithm detects one or more body key points of the user in an image plane of the user video, and wherein the CNN algorithm has been trained using one or more training videos;
generate a first user feature, comprising a posture feature vector, from the first user posture based on a) a trajectory of the one or more body key points associated with a portion of the user's body and b) a variance computed using coordinates associated with the trajectory, wherein the generating the first user feature from the first user posture is further based on a plurality of limb angles relative to a torso of the user, and wherein the plurality of limb angles is determined based on the first user posture;
determine a first output score based on a first distance between the reference feature and the first user feature, wherein the first distance is determined based on a weight associated with a portion of the user's body, and wherein the weight is determined based on a degree of motion associated with the portion of the user's body; and
determine a second output score greater than the first output score based on a determination that the degree of motion is greater than a threshold.

* * * * *